US007039876B2

(12) United States Patent
Lavendel et al.

(10) Patent No.: US 7,039,876 B2
(45) Date of Patent: May 2, 2006

(54) USER INTERFACE FOR IMAGE ACQUISITION DEVICES

(75) Inventors: Laurence A. Lavendel, Aptos, CA (US); Timothy L. Kohler, San Jose, CA (US); Edward Stitt, San Jose, CA (US); Harold Schoolcraft, San Jose, CA (US)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 08/944,435

(22) Filed: Oct. 6, 1997

(65) Prior Publication Data
US 2002/0126147 A1    Sep. 12, 2002

(51) Int. Cl.
*G06F 3/00* (2006.01)

(52) U.S. Cl. ...................... 715/777; 715/810
(58) Field of Classification Search ............... 345/339, 345/350, 352, 353, 354, 356, 357, 333, 334, 345/336, 337, 777, 776, 779, 810, 835, 840–841, 345/854; 358/518; 399/81
See application file for complete search history.

(56) References Cited

U.S. PATENT DOCUMENTS

| | | | | |
|---|---|---|---|---|
| 5,179,653 A | * | 1/1993 | Fuller ........................ | 345/354 |
| 5,739,809 A | * | 4/1998 | McLaughlin et al. ....... | 345/150 |
| 5,889,522 A | * | 3/1999 | Chew et al. ................ | 715/781 |
| 5,929,851 A | * | 7/1999 | Donnelly .................... | 345/333 |
| 6,433,801 B1 | * | 8/2002 | Moon et al. ................ | 715/840 |

OTHER PUBLICATIONS

Hewlett Packard, "HP ScanJet 5p Scanner User's Guide", pp. 2-19 through 2-28 (Sep. 1996).*
Adobe Press Release ("Adobe Announces New Version of Consumer Photo-Editing Software, Adobe PhotoDeluxe 2. 0"; pp. 1-3; Aug. 11, 1997).*
Adobe PhotoDeluxe 2.0 Screen Dumps (pp 1-3; 1997).*

(Continued)

*Primary Examiner*—Sy D. Luu
(74) *Attorney, Agent, or Firm*—Fitzpatrick, Cella, Harper & Scinto

(57) ABSTRACT

A user interface for image acquisition devices that provides common control of common features of different image acquisition devices while retaining the flexibility needed to provide tailored control that take advantage of unique features of each different image acquisition device. The user interface includes a control area for displaying a property sheet. The property sheet has a plurality of property pages, each of which has an interface for image acquisition device control and each of which has a tab describing the control provided by that property page. At least one property page has an interface for core image acquisition device control, and at least one property page has an interface for device-dependent image acquisition device control. The user interface also provides a property sheet with a property page that attractively provides plural interfaces for control in that property page. The property page includes a control region for providing control and a button region having multiple buttons. An appearance of the control region is changed in response to user manipulation of the multiple buttons, with each different appearance providing a different interface for the control.

25 Claims, 20 Drawing Sheets

OTHER PUBLICATIONS

This Week in Multimedia Software ("Adobe PhotoDeluxe 2.0", Multimedia Week, vol. 6, Issue 33, Aug. 25, 1997, pp 1-2).*

Adobe Photo Deluxe 2.0 for Windows—Computer Program & CD-ROM (Library of Congress Copyright Search, (Aug. 29, 1997).*

Adobe PhotoDeluxe 2.0 Screen Dumps # 2 (pp. 1-4; 1997).*

Adobe PhotoDeluxe 2.0 Screen Dumps # 3 (pp. 1-2; 1997).*

Guy Eddon & Henry Eddon, "Visual Basic 5.0 Relieves the Pain and Discomfort of ActiveX Control Creation, Part II", Microsoft Systems Journal, vol. 12, No. 3, p. 37 (Mar. 1997).

Dave Edson, "Chicago's Interface Gadgets, Part III: Programming Properly with Property Sheets", Microsoft Systems Journal, vol. 9, No. 10, p. 33 (Oct. 1994).

Matt Pietrek, "Poking Around Under the Hood: A Programmer's View of Windows NT 4.0", Microsoft Systems Journal, vol. 11, No. 8, p. 19 (Aug. 1996).

Jeff Prosise, "Interface Your Applications with the Windows 95 User Interface Using Shell Extensions", Microsoft Systems Journal, vol. 10, No. 3, p. 19 (Mar. 1995).

Jeff Prosise, "Programming Windows 95 with MFC, Part VI: Dialog, Boxes, Property Sheets, and Controls", Microsoft Systems Journal, vol. 10, No. 12, p. 53 (Dec. 1995).

Ken Ramirez, "Hot-rod Dialogs", Windows Tech. Journal, vol. 4, No. 7, p. 54 (Jul. 1995).

David A. Schmitt, "Dad, Can I Drive the Printer Tonight?", Windows Tech. Journal, vol. 4, No. 8, p. 40 (Aug. 1995).

Guy Townsend, "Vim, Vigor, and VxDs", Windows Tech. Journal, vol. 5, No. 11, p. 52 (Nov. 1996).

Joshua Trupin, "Borland Delphi: A New Entry in the Pantheon of Visual Programming Tools", Microsoft Systems Journal, vol. 10, No. 6, p. 37 (Jun. 1995).

The Windows® Interface Guidelines for Software Design, Microsoft Press, 1995, (9 pages).

* cited by examiner

USER INTERFACE FOR IMAGE ACQUISITION DEVICES

BACKGROUND OF THE INVENTION

This application is being filed with microfiche appendices of computer program listings consisting of one (1) fiche having fifty-six (56) frames.

A portion of the disclosure of this patent document contains material which is subject to copyright protection. The copyright owner has no objection to the facsimile reproduction by anyone of the patent document or the patent disclosure, as it appears in the Patent and Trademark office patent file or records, but otherwise reserves all copyright rights whatsoever.

1. Field of the Invention

The present invention concerns an improved user interface for controlling an image acquisition device. In particular, the present invention provides a user interface including a property page having an interface for core image acquisition device control and a property page having an interface for device-dependent image acquisition device control. The present invention also provides a user interface in which a property page of a property sheet attractively provides plural interfaces for the control provided by that property page.

2. Description of the Related Art

Computer systems often include at least one image acquisition device. Most common among these devices are scanners, although digital cameras are becoming increasingly popular. In order to access the functionality of such devices, users interact with user interfaces developed to provide control over the devices. These user interfaces may be provided by an operating system, an application, a device driver, or by software loaded within an input device.

Some features of image acquisition devices which are controlled by user interfaces are common to various devices, even among devices made by different manufacturers. For example, both the user interface for a Hewlett-Packard scanner and the user interface for a Kodak digital camera typically will provide control over an image scale feature. Despite this commonality, conventional user interfaces for different image acquisition devices vary markedly in how these common features are controlled. Thus, users must relearn the control of those common features each time a new image acquisition device is added to their systems.

One conventional solution to the above problem is to provide a generic user interface. However, such user interfaces typically lack the flexibility needed to take advantage of unique features of various image acquisition devices. For example, a generic scanner interface typically would be unable to provide control of a new smoothing feature of a new scanner, especially if previously-supported scanners did not provide similar smoothing features.

Accordingly, there is a need for a user interface that provides common control of common features of different image acquisition devices while retaining the flexibility needed to provide tailored control that takes advantage of the unique features of each different image acquisition device.

In addition to the above problem, there are typically many different perspectives from which a user interface might allow control by a user. For example, in using an image acquisition device, a novice has a different understanding of the concept of tone than that of an expert. For a novice, "tone" might be understood as no more than simple brightness/contrast control, whereas an expert might understand "tone" to refer to gamma or to the input/output characteristics of an editable tone curve. Thus, from the perspective of a novice, the user interface should provide for tone control with a simple brightness/contrast adjustment, whereas from the perspective of an expert, the user interface should provide for tone control with a fully editable tone curve. Generalizing this concept, it is advantageous for a user interface to provide plural different interfaces for a single control.

One conventional arrangement for providing a user interface with plural different interfaces consists of a property page having buttons corresponding to each different interface. When a button is selected, a separate window containing the corresponding interface is displayed. This window is "modal", which means that the user must make any desired adjustments within the window and exit the window before selecting another interface. Because this conventional arrangement requires the display of these modal windows, this arrangement results in a user interface that is cluttered and unwieldy.

Another conventional arrangement for providing a user interface with plural different interfaces consists of plural different interfaces crowded onto a single property page in a property sheet. Thus, one property page might provide a contrast/brightness interface, a gamma interface, and an editable curve interface, all displayed at once. However, this conventional arrangement leads to a poor user interface because the property page becomes too crowded and cluttered if more than a few interfaces are provided.

Alternatively, a user interface might provide plural different interfaces corresponding to a single control through a property sheet having separate property pages for each different interface. For example, in a scanner, to provide plural interfaces for tone control, one property page might have an interface that provides a contrast/brightness adjustment, and another property page might have an interface that provides an editable tone curve. However, this arrangement leads to a poor user interface for at least three reasons. First, too many property pages are needed, making the user interface unwieldy and unattractive. Second, because different interfaces to a single control are spread out over separate property pages, and because each interface has a different appearance, a user might be confused into thinking that each property page actually provides a different control. Third, in order to avoid inconsistencies, manipulation of one property page must be reflected in the other property pages, thereby violating a basic user interface design convention which requires that manipulation of one property page should not affect another property page. In contrast to this arrangement, a well-designed user interface typically will be organized so that a single exclusive control is provided by a single property page in a property sheet.

Accordingly, there is a need for a user interface in which a property page of a property sheet attractively provides plural interfaces for control provided by the property page.

SUMMARY OF THE INVENTION

The present invention addresses the foregoing deficiencies by providing a user interface for an image acquisition device. The user interface includes a preview area for displaying a preview image and a control area for displaying a property sheet. The property sheet has a plurality of property pages, each of the plurality of property pages having an interface for image acquisition device control. At least one property page has an interface for core image acquisition device control, and at least one property page has an interface for device-dependent image acquisition device control. Manipulation of the image acquisition device control is reflected in the preview image.

By means of this arrangement, the invention provides common interfaces for common features of different image acquisition devices while retaining flexibility needed to tailor the interface for unique features of different image acquisition devices. For example, in one representative embodiment, the user interface provides a property sheet with "Main", "Tone", and "Preferences" property pages for interfaces that provide core image acquisition device control. These three property pages are provided regardless of the kind of image acquisition device connected to a computer system executing the user interface. The property sheet-also can have one or more dynamically-loaded device-dependent property pages. Thus, if an interface is needed for the unique features of a particular scanner, for example a scanner that provides unique half-toning features, a dynamically-loaded device-dependent property page can provide that interface.

In the preferred embodiment, the user interface is provided by a TWAIN data source and is therefore used to control a TWAIN-compliant image acquisition device. One such TWAIN data source is disclosed in commonly-assigned U.S. patent application Ser. No. 08/944,434, entitled "TWAIN Architecture", which is incorporated herein as if set forth in full.

In another aspect, a user interface includes a property sheet with a plurality of property pages, each property page having a tab describing control provided by the property page. At least one of the property pages includes a control region for providing control and a button region having multiple buttons. An appearance of the control region is changed in response to user manipulation of the multiple buttons, with different appearances providing different interfaces for control. Preferably, the appearances of other property pages in the property sheet also can change, providing multiple interfaces, or are fixed, providing a single interface.

By means of this arrangement, a user can select a property page by selecting a tab that describes control provided by the property page. Then, by manipulating the multiple buttons on the property page, the user can select an interface. The appearance of the property page is changed in response to the manipulation of the buttons, allowing the user to choose the interface most suitable to the user for utilizing control provided by the property page.

For example, in one representative embodiment, a user interface according to the invention controls an image acquisition device. The user interface includes a property sheet with property pages tabbed for "Main" control, "Tone" control, and "Preferences" control. The appearances of the "Main" and "Preferences" property pages are fixed, providing fixed interfaces for main control and preferences control. In contrast, the "Tone" property page includes a button region with plural radio buttons and a control region whose appearance is changed so as to provide different interfaces for tone control. The button region includes buttons for the following types of tone control: automatic, brightness/contrast, gamma, histogram, and editable curve. The appearance of the control region of the "Tone" property page is changed in response to user manipulation of these buttons. For example, when the gamma tone control button is selected, the appearance of the control region is changed so as to display gamma tone control, such as control by a slide and a text box for selecting a gamma value and a transfer curve representing the effect of the gamma value on tone. Alternatively, when the editable curve tone control button is selected, an appearance of the control region is changed so as to display editable curve tone control, such as control by a text box for selecting special tone curves and a fully editable tone curve. Thus, the different appearances provide different interfaces for the control provided by the property page, in this case tone control.

In a related aspect, the multiple buttons are arranged based on user familiarity with or complexity of the different interfaces resulting from user manipulation of the multiple buttons. By means of these arrangements, a user can easily select the interface that best suits his or her level of expertise or needs. For example, in terms of the representative embodiment described above, the radio buttons are arranged in the following order, from most familiar to novices to familiar primarily to experts: auto, brightness/contrast, gamma, histogram, and editable curve. A novice could select the auto tone control interface, and an expert could select the editable curve tone control interface. As described above, the appearance of the control region of the "Tone" property page, and the corresponding interface for tone control, would change accordingly.

In another aspect, an appearance of a property page is changed so as to provide plural different interfaces. The property page includes plural elements such as list boxes, text boxes, slides, curves, and the like. A first interface includes at least one of the plural elements, and a second interface includes at least one of the plural elements. The first interface is provided by showing the at least one of the plural elements included in the first interface and by hiding all other of the plural elements. The appearance of the property page is changed so as to provide the second interface in response to user manipulation of multiple buttons. The second interface is provided by showing the at least one of the plural elements included in the second interface and by hiding all other of the plural elements.

This brief summary has been provided so that the nature of the invention may be understood quickly. A more complete understanding of the invention can be obtained by reference to the following detailed description of the preferred embodiments thereof in connection with the attached drawings.

BRIEF DESCRIPTION OF THE DRAWINGS

FIG. 10a is a view illustrating a "CS600" property page, which provides a sample device-dependent interface for device-dependent control of a model "CS600" scanner.

FIG. 10b is a view illustrating a "C5000" property page, which provides a sample device-dependent interface for device-dependent control of a model "C5000" multipass scanner.

FIG. 11a is a view illustrating an interface for automatic tone control.

FIG. 11b is a view illustrating an interface for contrast/brightness tone control.

FIG. 11c is a view illustrating an interface for gamma tone control.

FIG. 11d is a view illustrating an interface for histogram tone control.

FIG. 11e is a view illustrating an interface for editable curve tone control.

DETAILED DESCRIPTION OF THE PREFERRED EMBODIMENT

Figure 1:
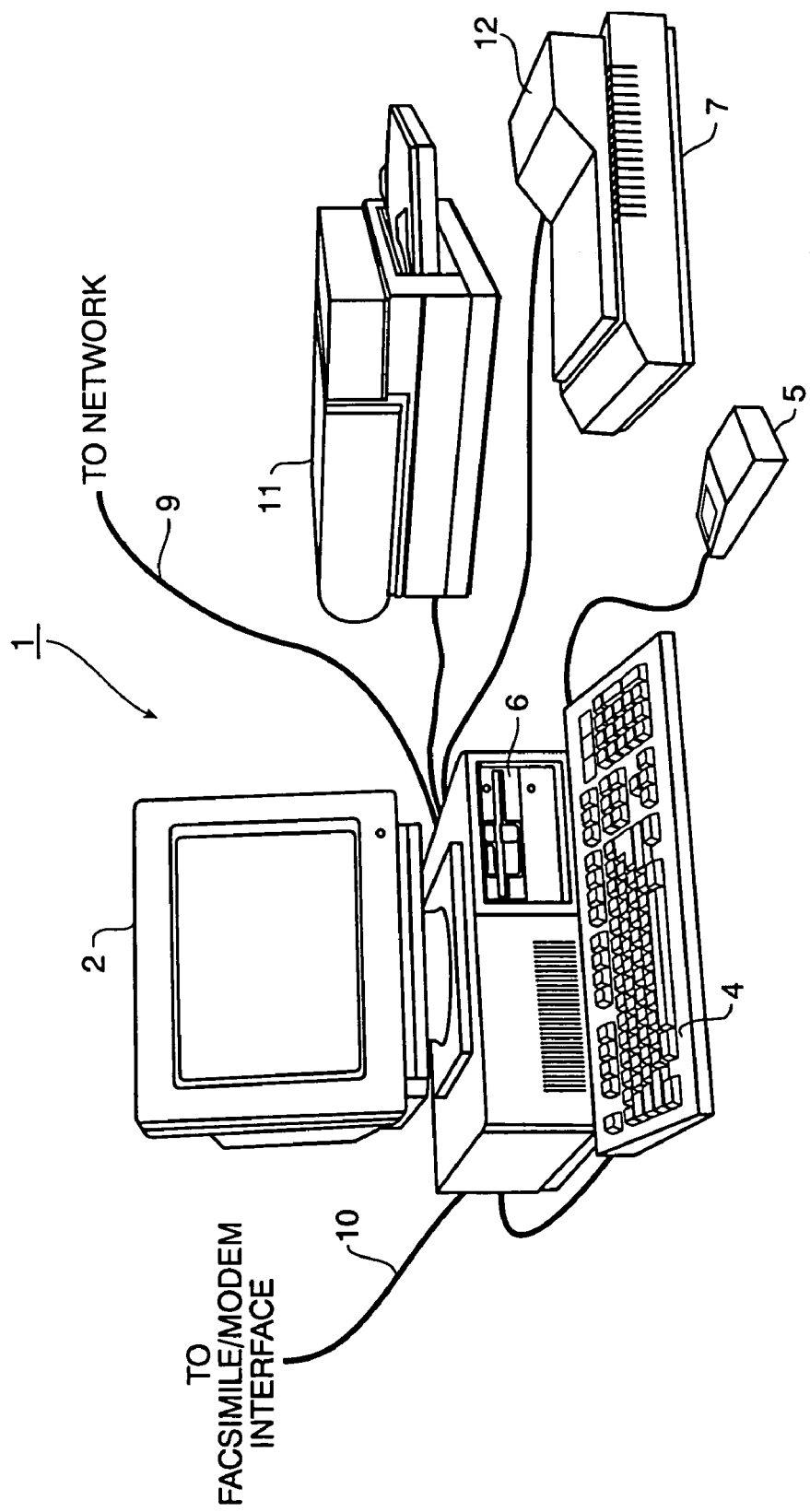
FIG. 1 is a view of the outward appearance of a representative computing system.

FIG. 1 is a representational view of a computer system in which the present invention may be utilized. Computer system 1 may be a Macintosh, PC-compatible, or other type of system having a windowing environment, such as Microsoft® Windows. Provided with computer system 1 are display 2 which may be a color monitor, keyboard 4 for entering user commands and pointing device 5 such as a mouse for pointing to and for manipulating graphical user interfaces and other objects displayed on display 2.

Computer system 1 also includes a mass storage device such as fixed disk 6 for storing image processing applications, computer-executable process steps to implement dynamically-loadable device drivers, computer-executable process steps to implement dynamically-loadable device user interfaces, and computer-executable process steps to implement the below-described TWAIN data source architecture and other applications. Such storage may also be provided by a CD-ROM (not shown).

Scanner 7 and film adapter unit 12 are image acquisition devices that are also included. Scanner 7 may be used to scan documents so as to provide images of those documents to an image processing application executing within computer system 1. Examples of scanner 7 are a Canon model CS600 scanner and a Canon model C5000 multipass scanner. Film adapter unit 12 is an adapter that attaches to certain models of scanner 7 so as to allow scanner 7 to perform similar functions with film instead of with documents. Of course, images may be input into computer system 1 using other image acquisition devices, such as a digital camera or the like. Images may also be input into computer system 1 from a variety of other sources, such as from a Local Area Network (LAN) through network interface 9. Printer 11 is provided for outputting processed images.

It should be understood that, although a programmable general purpose computer is shown in FIG. 1, a dedicated computer terminal or other type of data processing equipment can utilize a TWAIN data source as discussed below.

Figure 2:
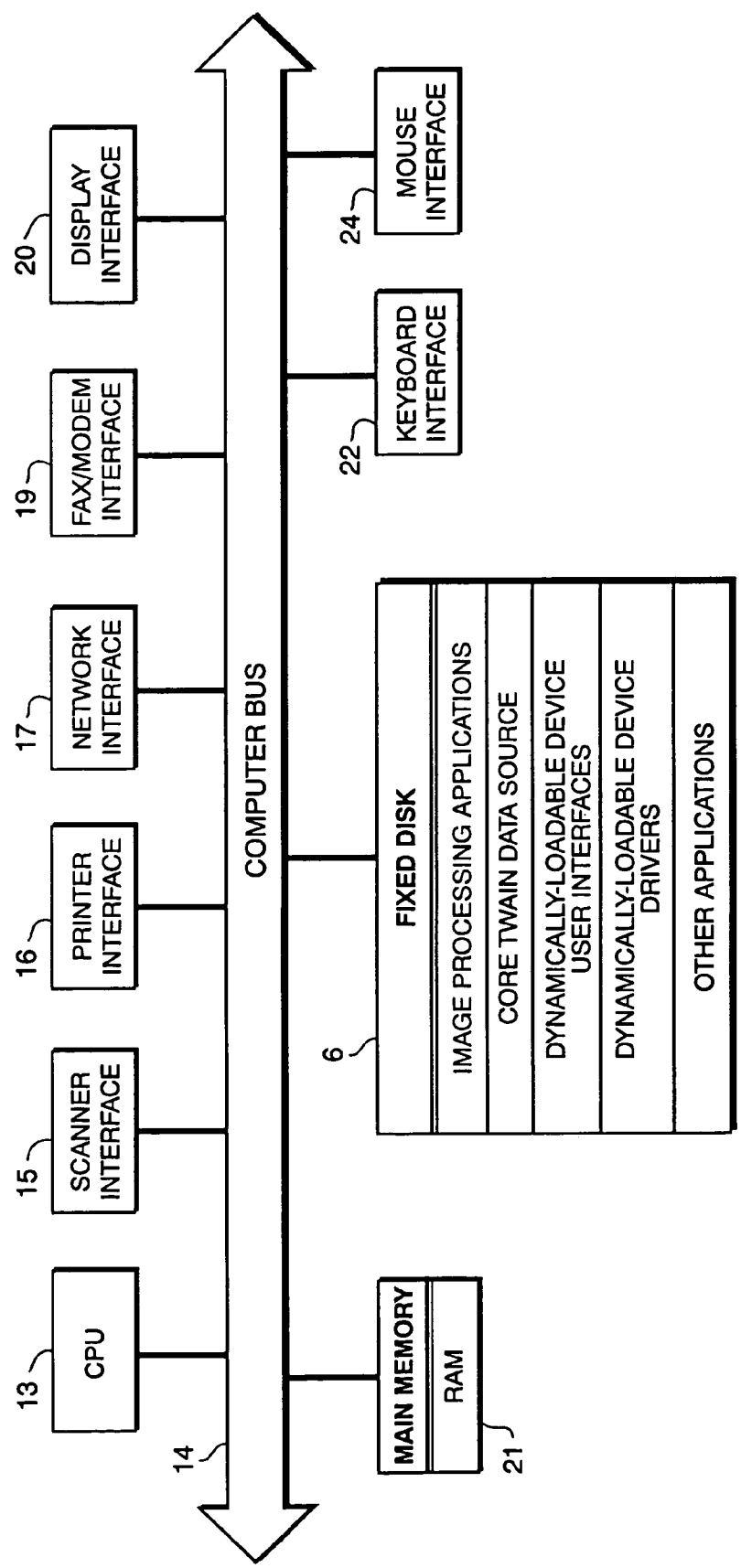
FIG. 2 is a block diagram illustrating the internal architecture of the FIG. 1 system.

FIG. 2 is a detailed block diagram showing the internal architecture of computer system 1. As shown in FIG. 2, computer system 1 includes central processing unit (CPU) 13 which interfaces with computer bus 14. Also interfacing with computer bus 14 is scanner interface 15, printer interface 16, network interface 17, facsimile/modem is interface 19, display interface 20, main random access memory (RAM) 21, fixed disk 6, keyboard interface 22, and mouse interface 24. Scanner interface 15 can be a SCSI interface or a parallel interface. For example, in a case that scanner 7 is a Canon model CS600 scanner, scanner interface 15 is a SCSI interface. In a case that scanner 7 is a Canon model C5000 multipass scanner, scanner interface 15 is a parallel interface.

Main memory 21 interfaces with computer bus 14 so as to provide RAM storage to CPU 13 during execution of software applications. More specifically, CPU 13 loads process steps from fixed disk 6 into main memory 21 and executes the stored process steps from main memory 21 in order to provide a TWAIN data source to a client application.

As also shown in FIG. 2, fixed disk 6 contains image processing applications such as Adobe Photoshop or Corel Draw, computer-executable process steps to provide a core TWAIN data source as described below, computer-executable process steps to provide dynamically-loadable device user interfaces, computer-executable process steps to provide dynamically-loadable device drivers, and other applications. It should be noted that the process steps to provide the present core TWAIN data source include process steps to provide a core TWAIN graphical user interface, such as the core TWAIN graphical user interface described below.

Figure 3:
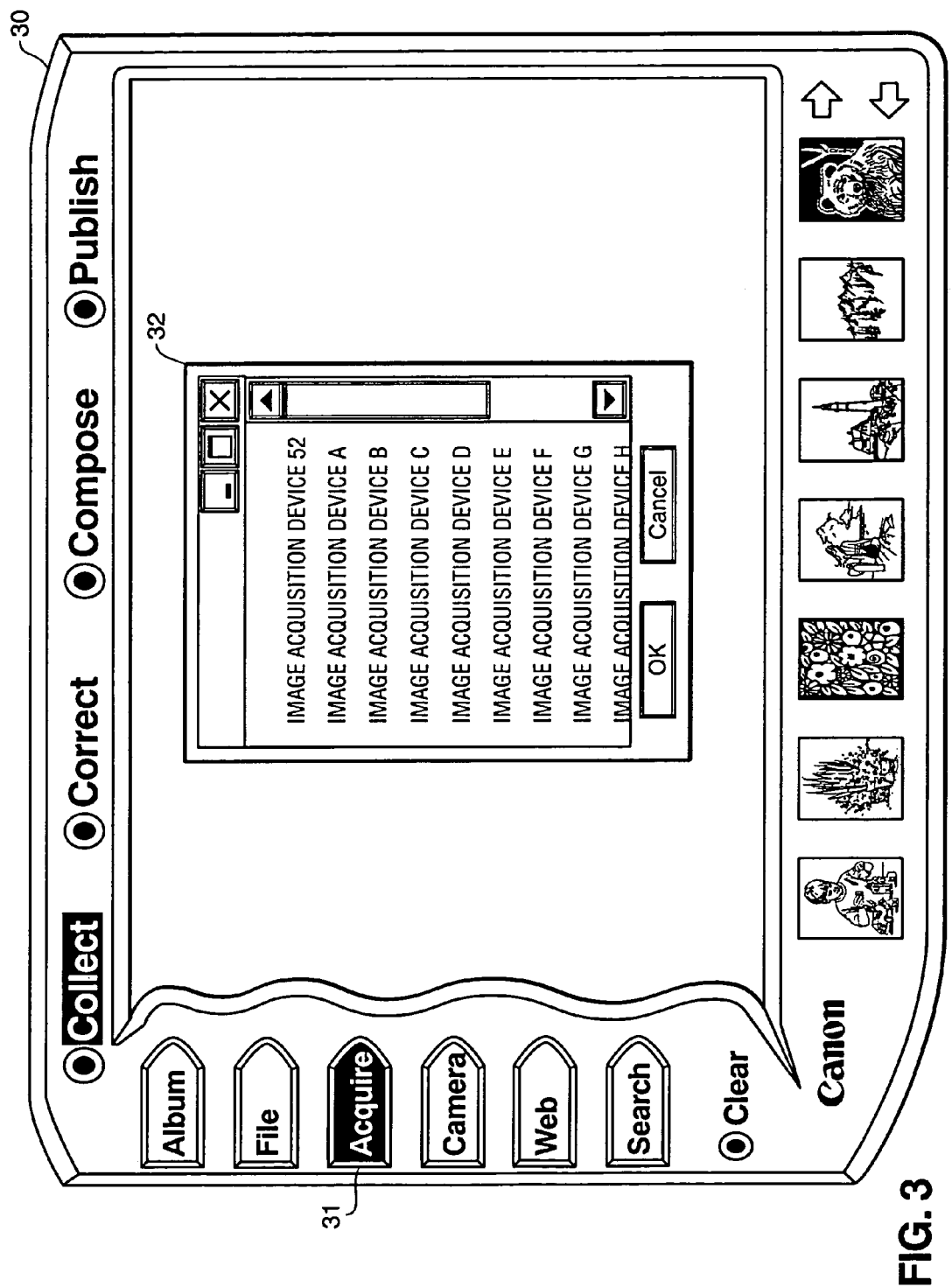
FIG. 3 is a view of a graphical user interface of a client image processing application.

FIG. 3 shows user interface 30 of a client image processing application. Upon selection of "Acquire" button 31, menu 32 is displayed. As shown, menu 32 includes a list of available TWAIN data sources. In accordance with the TWAIN protocol, Acquire button 31 provides a link to a TWAIN data source manager, which provides, in turn, information required to create menu 32.

Figure 4:
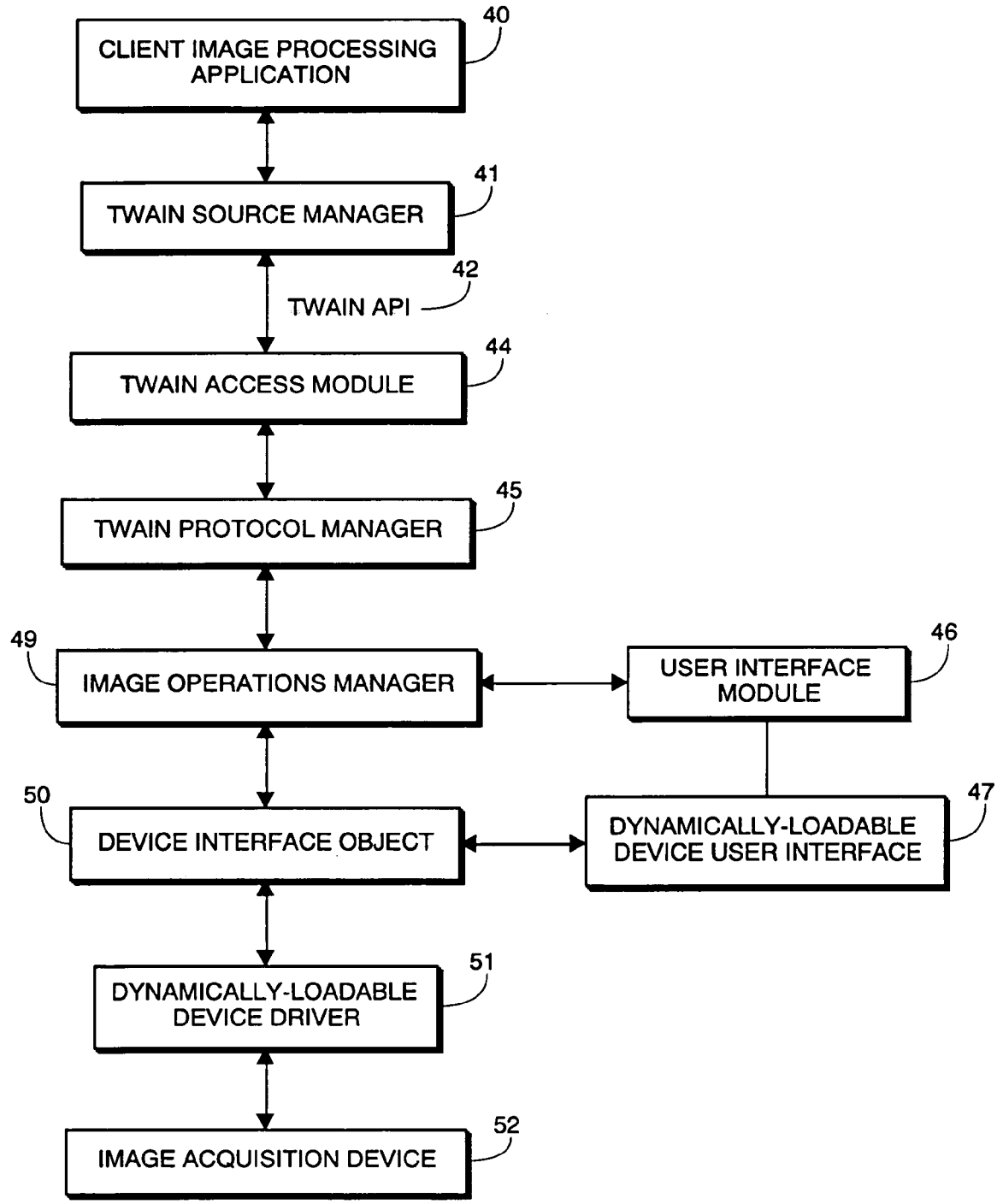
FIG. 4 is a block diagram of a TWAIN-compliant image processing system utilizing a TWAIN data source according to the present invention.

FIG. 4 is a block diagram illustrating a TWAIN-compliant system utilizing the presently-described TWAIN data source architecture. The system includes client image processing application 40 for processing images received from image acquisition devices, data files, or the like. As stated above, client image processing application 40 communicates with TWAIN source manager 41 upon user selection of Acquire button 31. Although indicated as separate elements in FIG. 4, TWAIN source manager 41 is often bundled together with client image processing application 40.

TWAIN source manager 41 is responsible for locating TWAIN data sources, calling TWAIN data sources, and for managing communication with TWAIN data sources. As described above, a TWAIN data source is a dynamic link library (DLL) which provides both device driver functionality and a TWAIN user interface to a TWAIN-compliant image processing application. In the present case, the subject data source provides a core TWAIN user interface and also provides means for supporting a dynamically-loaded device-dependent user interface.

TWAIN access module 44 identifies the subject TWAIN data source to TWAIN source manager 41. Moreover, TWAIN access module 44 presents a software entry point to TWAIN source manager 41, as required by the TWAIN specification. TWAIN source manager 41 uses the entry point to pass TWAIN triplets to the subject TWAIN data source.

TWAIN access module 44 receives TWAIN commands, in the form of TWAIN triplets, from TWAIN source manager 41 and passes the triplets to TWAIN protocol manager 45.

TWAIN protocol manager 45 parses TWAIN triplets received from TWAIN access module 44 and executes appropriate actions by communicating with image operations manager 49. Accordingly, any functionality requested by client image processing application 40 is provided by TWAIN protocol manager 45.

User interface module 46 presents a core TWAIN user interface to a user and receives user input by detecting user manipulation of the interface. User input received by user interface module 46 is passed to image operations manager 49. As described in detail below, the graphical user interface provided by user interface module 46 is capable of supporting a device-dependent, dynamically-loadable user interface corresponding to a selected image acquisition device.

User interface module 46 is solely responsible for display and control of the core graphical user interface, therefore another core graphical user interface can be employed simply by replacing user interface module 46 with another user interface module 46 capable of display and control of a different core TWAIN graphical user interface.

Image operations manager 49 receives the commands input into the core TWAIN user interface and into any dynamically-loaded user interface. Accordingly, image operations manager 49 translates these inputs into actual operations. Image operations manager 49 also receives parsed TWAIN triplets from TWAIN protocol manager 45 in order to execute appropriate actions.

In addition, image operations manager 49 controls image input, manipulation, and resource allocation. Accordingly, image operations manager 49 is responsible for sending received image data to optional image processing modules such as an in-line transformation module for line-by-line processing (half toning, color adjustment, etc.) and, if necessary, for sending the data to another image processing module such as an image transformation module, a color matching module, or other imaging utilities.

Image operations manager 49 is preferably configured so as to query a device driver corresponding to a selected image acquisition device as to the capabilities of the acquisition device, and to negotiate with client image processing application 40, using TWAIN API 42 and TWAIN protocol manager 45, in order to determine image acquisition parameters. Image acquisition parameters are used to control features of an image acquisition device and thereby define the properties under which image acquisition occurs.

Image operations manager 49 is also responsible for communicating with device interface object 50.

Figure 5:
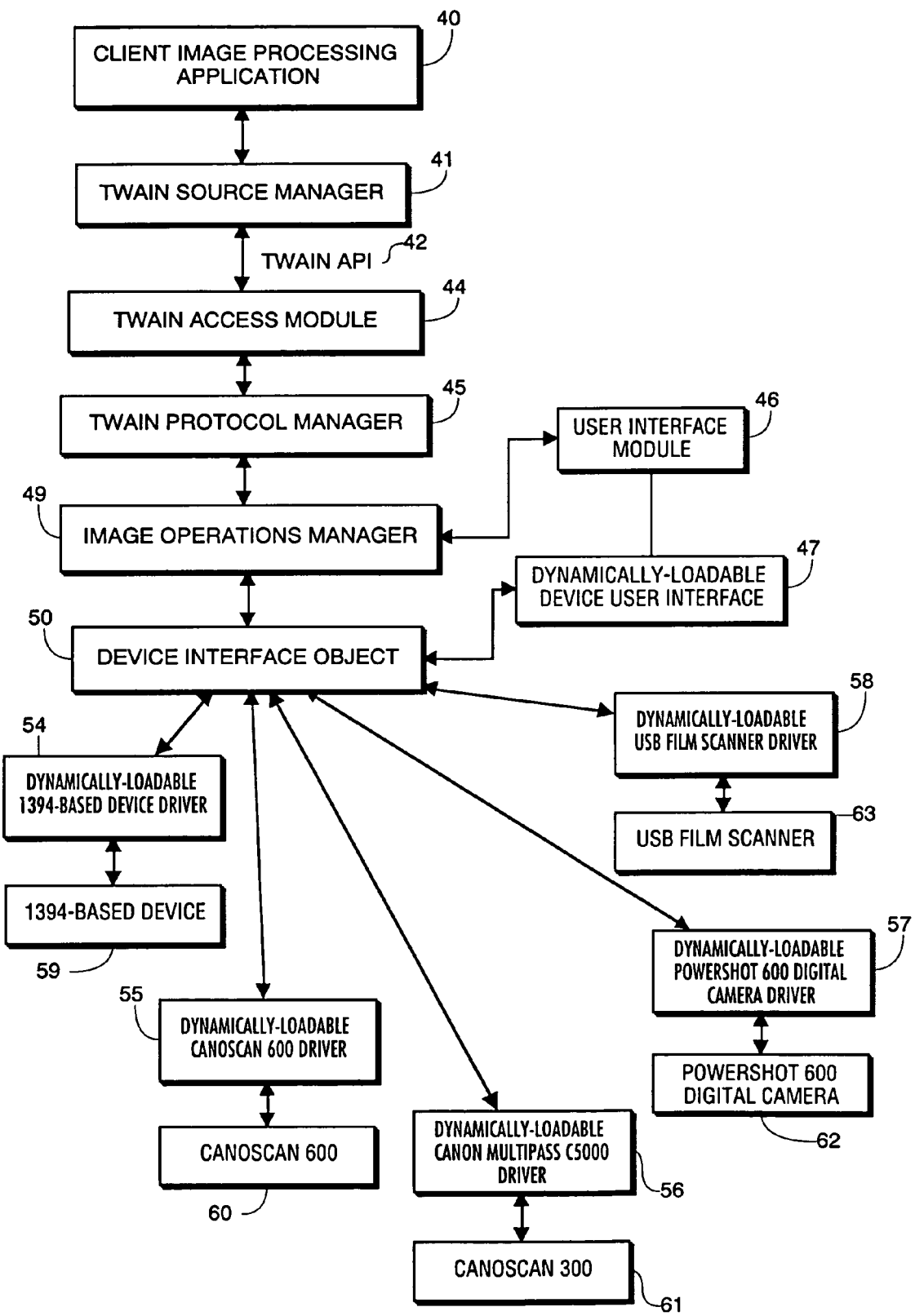
FIG. 5 is a block diagram of a TWAIN-compliant image processing system utilizing a TWAIN data source according to the present invention.

Device interface object 50 communicates with image operations manager 49 and with a selected software device driver. More specifically, device interface object 50 is responsible for dynamically loading a device driver which corresponds to selected image acquisition device 52. As shown in FIG. 5, device interface object 50 allows multiple image acquisition devices 59 to 63 to be connected to the system via dynamically-loadable device drivers 54 to 58, and also provides device drivers with a common interface to image operations manager 49.

Device interface object 50 is also responsible for loading dynamically-loadable device user interface 47 corresponding to selected image acquisition device 52.

By virtue of the foregoing, an image acquisition device vendor need only provide dynamically-loadable device driver 51 for interfacing to device interface object 50 and dynamically-loadable device user interface 47 in order to provide TWAIN support for acquisition device 52.

Figure 6:
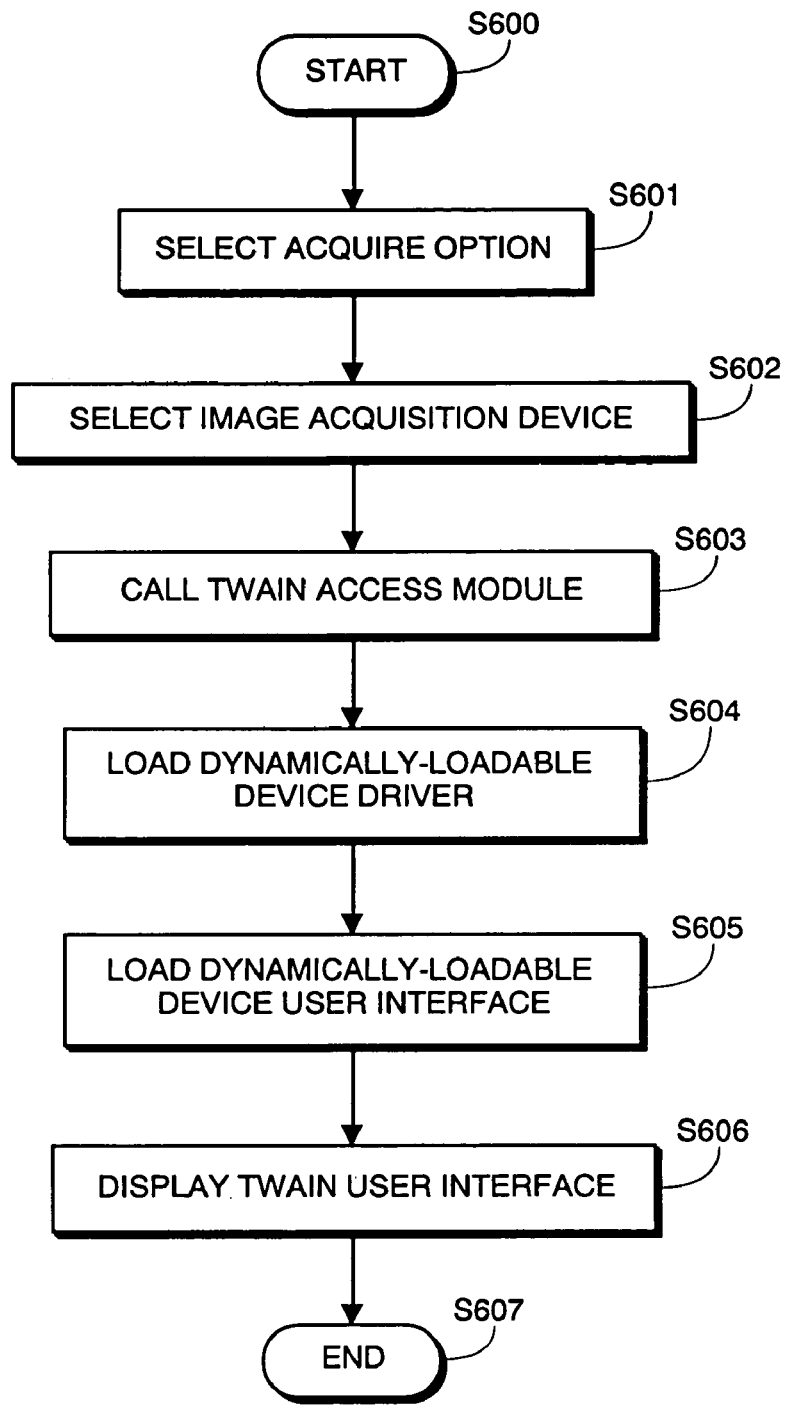
FIG. 6 is a flowchart for describing operation of a TWAIN data source according to the present invention.

FIG. 6 is a flowchart for describing an operation of a TWAIN data source within the system shown in FIG. 4. Flow begins at step S600.

In step S601, a user selects Acquire button 31 from user interface 30 of client image processing application 40. In response to the selection, TWAIN data source menu 32 is displayed. Flow proceeds to step S602, in which image acquisition device 52 is selected from menu 32. Next, in step S603, TWAIN source manager 41 calls TWAIN access module 44, which corresponds to image acquisition device 52, in order to enable communication between client image processing application 40 and image acquisition device 52.

In step S604, device interface object 50 loads dynamically-loadable device driver 51 corresponding to image acquisition device 52. Flow continues to step S605, at which device interface object 50 loads dynamically-loadable device user interface 47, also corresponding to image acquisition device 52. Accordingly, dynamically-loadable device driver 51 is used to control image acquisition device 52 based on user manipulation of dynamically-loadable device user interface 47 and of a core TWAIN user interface provided by user interface module 46.

In step S606, a TWAIN user interface is displayed. The TWAIN user interface incorporates both the core TWAIN user interface and dynamically-loadable device user interface 47. Flow terminates at step S607.

Attention is now directed to a user interface for a TWAIN data source. Briefly, such a user interface provides common control for common features of different image acquisition devices while retaining the flexibility needed to provide tailored control that takes advantage of the unique features of each different image acquisition device. The user interface includes a control area for displaying a property sheet. The property sheet has a plurality of property pages, each of the plurality of property pages having an interface for image acquisition device control. At least one property page has an interface for core image acquisition device control, and at least one property page has an interface for device-dependent image acquisition device control. Manipulation of the image acquisition device control is reflected in the preview image.

Figure 7:
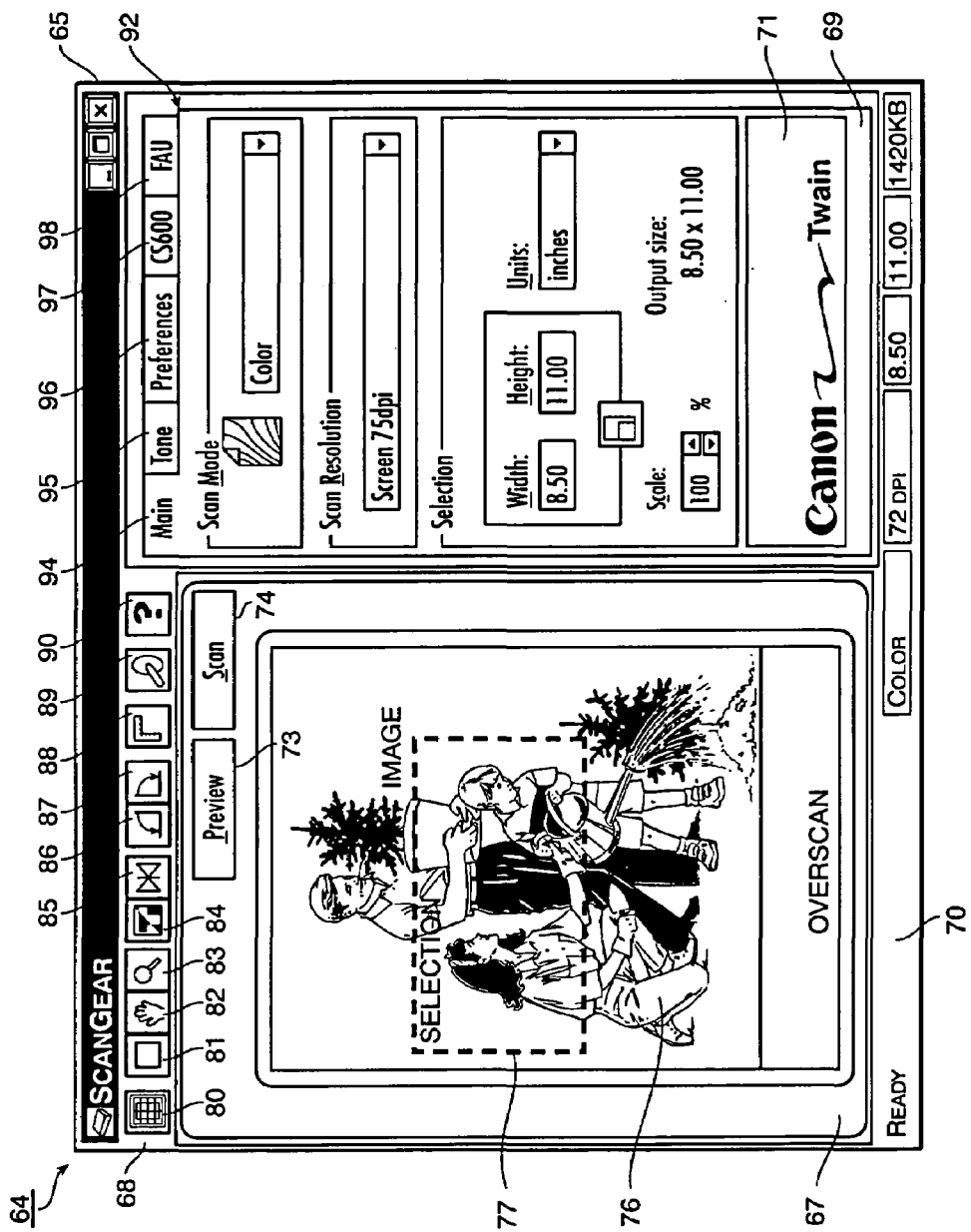
FIG. 7 is a view illustrating a general organization of a user interface for an image acquisition device.

In more detail, FIG. 7 is a view illustrating a general organization of user interface 64 for an image acquisition device attached to computer system 1. In the preferred embodiment, user interface 64 is provided by a TWAIN data source and is therefore used to control a TWAIN-compliant image acquisition device. For the following discussion, a model CS600 scanner and a film adapter unit are assumed to be such image acquisition devices and are attached to computer system 1.

It should be noted that in the preferred embodiment, user interface 64 is implemented in computer-executable process steps provided by user interface module 46. The computer-executable process steps can be stored on a computer-readable medium, such as fixed disk 6, and executed by CPU 13 from memory 21.

In FIG. 7, user interface 64 has main window 65, which includes preview area 67, tool bar 68, control area 69, status bar 70, and logo box 71.

Preview area 67 includes preview button 73 and scan button 74. When preview button 73 is selected, a selected image acquisition device delivers preview image 76 at the resolution of display 2. Because this resolution is relatively low, typically about 75 dpi, this preview scan is extremely fast. Preview image 76 is displayed in preview area 67. User interface 64 then can be manipulated so as to adjust preview image 76 and to adjust the selected image acquisition device, as described below. Preview image 76 immediately reflects these adjustments. Then, when scan button 74 is selected, the image acquisition device delivers an image according to the adjustments.

Tool bar 68 includes various tools for selecting a scan area 77 from preview area 67 and for manipulating the view of preview image 76. These selections and manipulations affect how the image is delivered when scan button 74 is clicked. For example, only scan area 77 is scanned when scan button 74 is clicked, and not all of preview image 76.

Clear preview tool 80 clears preview image 76 and resets all settings of user interface 64 to their default (start-up) values.

Three cursor tools include selection tool 81, move tool 82, and zoom tool 83. These three tools are radio buttons, meaning only one can be selected at a time.

Selection tool 81 allows the selection of scan area 77 in preview area 67. Scan area 77 is the area that is previewed or scanned the next time preview button 73 or scan button 74 is selected.

Move tool 82 sets the cursor to a hand shape when placed in preview area 67 and allows the user to move around the magnified view of preview image 76. The user moves around the view by "grabbing" the image and dragging it around preview area 67. When the cursor is dragged in preview area 67, preview image 76 scrolls in preview area 67 in the same direction and by the same amount as the drag.

Zoom tool 83 sets the cursor to a magnifying glass when placed in preview area 67 and allows the user to magnify and to reduce preview image 76. Pressing the left mouse button causes preview image 76 to zoom in, magnifying the image by two times. When zoomed in, preview area 67 includes scroll bars (not shown) for scrolling across preview image 76. Pressing the right mouse button causes preview image 76 to zoom out, reducing the image to the next zoom ratio of a predetermined set of zoom ratios. In the preferred embodiment, the set of zoom ratios consists of 1:1.5, 1:2, 1:3, and 1:4. Preview image 76 cannot be zoomed out further than the last preview performed (i.e., the last time preview button 73 was selected).

Two position tools include invert tool 84 and mirror tool 85. Invert tool 84 inverts the individual RGB values of each pixel of preview image 76. This inversion results in an image akin to a negative of an original. Mirror tool 85 horizontally flips preview image 76.

When selected, rotate counter-clockwise tool 86 and rotate clockwise tool 87 cause preview image 76 to rotate ninety degrees in the appropriate direction. Note that in a zoomed view, both preview image 76 and scan area 77 rotate about the center point of preview area 67. Therefore, the contents of preview image 76 and scan area 77 do not change; only their orientation is altered.

Ruler tool 88 produces rulers at the top and left edges of preview area 67. The rulers use the same units as designated in units list box 109 of "Main" property page 94, discussed below. In a magnified view, the markings on the rulers change according to the scroll position.

Auto button 89 serves as a proxy of auto tone control button 133 in "Tone" property page 95, discussed below. Selecting this button activates automatic tone correction; selecting it again deactivates automatic tone correction. Note that the setting of auto button 89 is reflected by auto tone control button 133, and vice versa. In other words, if one of the buttons is in the "on" position, the other button will be in the "on" position.

Help tool 90 invokes a help window. In the preferred embodiment, this window is a TWAIN Acquire Help Topics window.

Control area 69 includes property sheet 92 with plural property pages 94 through 98. Each property page includes a tab describing control provided by the property page. Thus, "Main" property page 94 provides main control, "Tone" property page 95 provides tone control, and "Preferences" property page 96 provides preferences control. Because a model CS600 scanner and an FAU are attached to computer system 1 and the necessary software is loaded on hard drive 6, property sheet 92 includes "CS600" property page 97 and "FAU" property page 98. "CS600" property page 97 provides control of the CS600 model scanner, and "FAU" property page 98 provides control of the film adaptor unit.

Status bar 70 provides feedback to the user. This feedback includes information on current operational status (i.e., scanning, previewing, how to get help, etc.), color mode, selected resolution, selected scanning area width and height, and the resulting file size of the current scan selection and settings.

Logo box 71 displays a Canon TWAIN logo, but the box can be modified to serve other purposes as needed.

Figure 8:
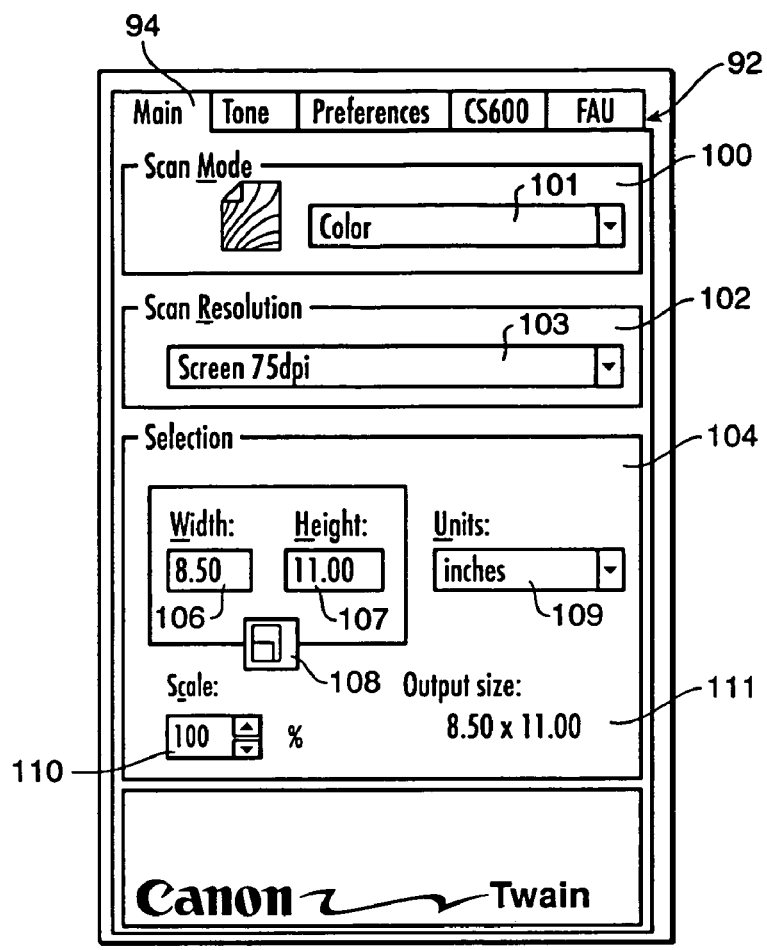
FIG. 8 is a view illustrating a "Main" property page, which provides an interface for main core control.

FIG. 8 is a view illustrating "Main" property page 94, which provides an interface for main core control. "Main" property page 94 is device-independent; it is included in property sheet 92 regardless of the kind of image acquisition device connected to computer system 1. For example, "Main" property page 94 is included in property sheet 92 regardless of whether the image acquisition device is a scanner, a digital camera, or a film adapter unit. Accordingly, the interface for control displayed in "Main" property page 94 corresponds to core features common to different image acquisition devices.

In the preferred embodiment, the main control corresponds to core TWAIN control. The main control includes the most essential control for controlling a TWAIN-compliant image acquisition device. Thus, "Main" property page 94 includes scan mode area 100, scan resolution area 102, and scan selection area 104. Any user manipulation made in these areas is immediately reflected by preview image 76.

Scan mode area 100 includes mode list box 101, which allows the user to select color, grayscale, text enhanced, or black and white mode. In the preferred embodiment, if the black and white mode is selected in mode list box 101, "Tone" property page 95 is hidden (i.e., inaccessible to the user), and tone control is provided by the appropriate device-dependent property page for each image acquisition device.

Scan resolution area 102 includes list box 103, which allows the user to select a resolution for acquiring an image in terms of a target output device. For example, if a user knows that he or she will be displaying a scanned image on a 75 dpi display screen, the user can select "Screen 75 dpi", and the image acquisition device will acquire the image at that resolution. One of the default entries provided in list box 103 is for "custom resolution" (not shown). Selecting "custom resolution" results in a dialog box that allows the user to assign a resolution to an output device type, such as a new printer or a display screen. Alternatively, a user can simply enter a value into list box 103 to select the resolution.

Scan selection area 104 includes width text box 106, height text box 107, proportion constraint button 108, units list box 109, scale spinner 110, and output size text 111.

Width text box 106 and height text box 107 contain the width and height of the current scan area 77. These text boxes can be edited, causing scan area 77 to change accordingly, with the upper left corner of scan area 77 remaining fixed.

When proportion constraint button 108 is selected ("on"), scan area 77 is restricted to the current height to width ratio. In order to remind the user of this restriction, an image of a chain (not shown) appears between width text box 106 and height text box 107.

Units list box 109 allows the user to select the units used for width text box 106 and height text box 107. The selected units are also used for the rulers in preview area 67 if ruler tool 88 is selected.

Scale spinner 110 contains the scale factor to be applied to scan area 77. Modifying the scale factor changes the output size for a scan.

Output size text 111 simply displays the output size of the current scan area, accounting for any adjustments made in selection area 104.

Figure 9:
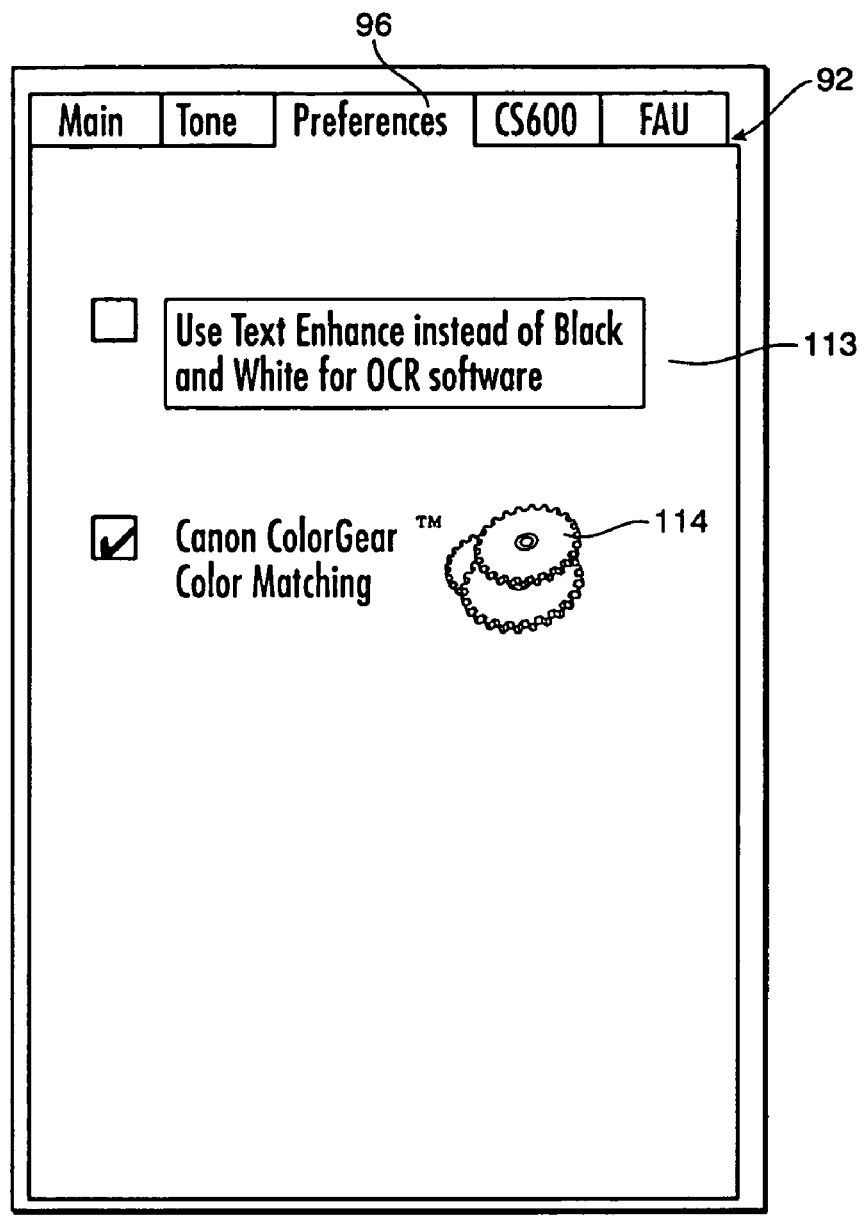
FIG. 9 is a view illustrating a "Preferences" property page, which provides an interface for preferences core control.

FIG. 9 is a view illustrating "Preferences" property page 96, which provides an interface for preferences core control. "Preferences" property page 96 is device-independent; it is included in property sheet 92 regardless of the kind of image acquisition device connected to computer system 1. Accordingly, the interface for control displayed in "Preferences" property page 96 corresponds to core features common to different image acquisition devices.

In the preferred embodiment, the preferences control also corresponds to core TWAIN control. The preferences control allows the user to control a number of TWAIN image acquisition settings, such as settings for text enhancement, for subsequent optical character recognition, and for color matching. Thus, "Preferences" property page 96 includes text enhancement check box 113 and color matching check box 114. User manipulation of color matching check box 114 is immediately reflected by preview image 76.

Figure 10A:
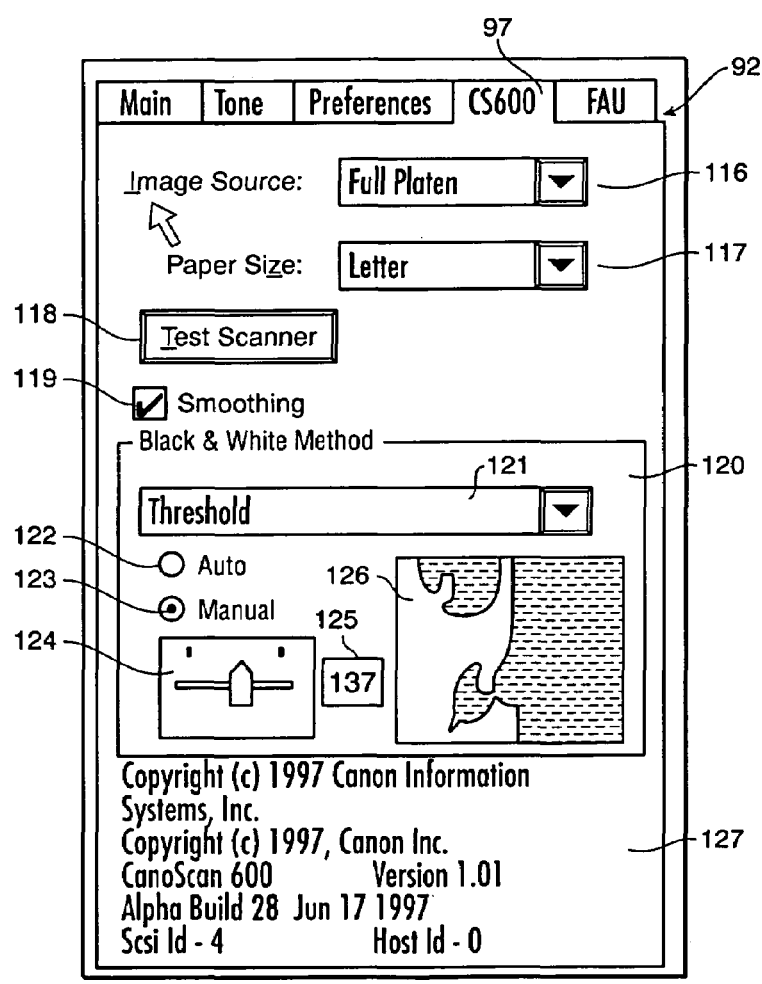
FIGS. 10a and 10b are views illustrating sample device-dependent interfaces for device-dependent control of scanners.
Figure 10B:
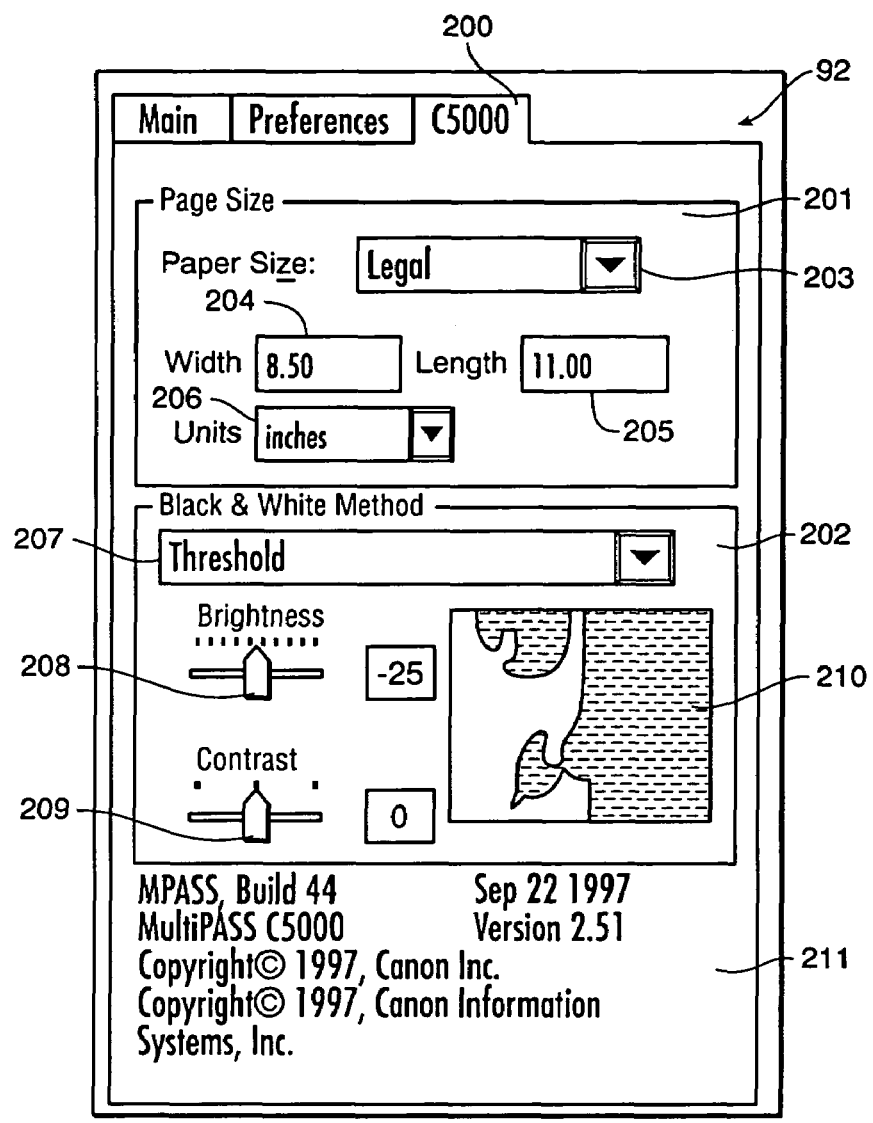

FIGS. 10a and 10b are views illustrating sample device-dependent interfaces for device-dependent control of scanners.

FIG. 10a is a view illustrating "CS600" property page 97, which provides a sample device-dependent interface for device-dependent control of a model "CS600" scanner, shown as scanner 7 in FIG. 1. This interface is dynamically loaded by device interface object 50. Thus, "CS600" property page 97 provides tailored control needed to take advantage of features unique to the CS600 scanner. Any user manipulation of the interface is immediately reflected by preview image 76.

"CS600" property page 97 includes image source list box 116, paper size list box 117, test scanner button 118, smoothing check box 119, half-tone area 120, and information area 127. Image source list box 116 allows the user to select the scanning source. Possible options are platen and film adapter unit. Paper size list box 117 allows the user to select a default preview scanning size. Test scanner button 118 begins the execution of any diagnostics that can be performed. Results are shown in a dialog pop-up box (not shown). Smoothing check box 119 enables device-specific smoothing.

Half-tone area 120 includes half-tone type list box 121, auto check box 122, manual check box 123, threshold slide 124, threshold text box 125, and proxy image 126. Half-tone type list box 121 lists all available half-tone patterns. Half-tone patterns only have an effect when mode list box 101 in "Main" property page 94 is set to black and white mode. Auto check box 122 allows automatic setting of a threshold value if a threshold method of half-toning is selected in half-tone type list box 121. Auto check box 122 is disabled if any other method is selected manual check box 123 allows the user to choose to manually set the threshold for the threshold method of half-toning. Threshold slide 124 and threshold check box 125 are used to manually set the threshold. The effects of the selected half-tone pattern and threshold are reflected in proxy image 126.

Information area 127 displays relevant information, such as interface model and revision.

Also shown in FIG. 10 is a tab for "FAU" property page 98, which is another sample device-dependent interface for device-dependent control. "FAU" property page 98 provides an interface specific to a film adapter unit, such as film adapter unit 12 shown in FIG. 1. Accordingly, "FAU" property page 98 allows a user to take advantage of features unique to film adapter unit 12.

FIG. 10b is a view illustrating "C5000" property page 200, which provides a sample device-dependent interface for device-dependent control of a model C5000 multipass scanner. This interface is dynamically loaded by device interface object 50. Thus, "C5000" property page 200 provides tailored control needed to take advantage of features unique to the C5000 scanner. Any user manipulation of the interface is immediately reflected by preview image 76.

"C5000" property page 200 includes page size area 201, black and white options area 202, and information area 211. Page size area 201 includes paper size list box 203, width text box 204, length text box 205, and units list box 206. Page size area 201 allows the user to select a size for the scanned image, either by selecting a paper size in paper size list box 203 or by directly selecting page dimensions with width text box 204 and length text box 205. The values in width text box 204 and length text box 205 are in the units selected in units list box 206.

Black and white options area 202 includes half-tone type list box 207, brightness slide 208, contrast slide 209, and proxy image 210. Half-tone type list box 207 lists all available half-tone patterns. Half-tone patterns only have an effect when mode list box 101 in "Main" property page 94 is set to black and white mode. Brightness slide 208 and contrast slide 209 provide tone control for the scanned image. The effects of the selected half-tone pattern, brightness slide setting, and contrast slide setting are reflected in proxy image 210.

In the preferred embodiment, when mode list box 101 of "Main" property page 94 is set to black and white mode, "Tone" property page 95 is hidden (i.e., inaccessible to the user). In that case, tone control may be provided by the appropriate device-dependent property page for a selected image acquisition device. FIG. 10b illustrates this situation: tone property page 95 is hidden (i.e., not shown in property sheet 92), and brightness slide 208 and contrast slide 209 provide tone control.

Information area 211 displays relevant information, such as interface model and revision.

Additional property pages may be displayed for controlling other devices and for controlling extended features of existing devices, as needed. In the case of extended features of an existing device, a dynamically-loaded property page can be implemented as an additional property page or as a replacement of the existing property page for the existing device.

FIGS. 11a through 11e are views illustrating "Tone" property page 95, which provides plural interfaces to tone core control. "Tone" property page 95 is device-independent; it is included in property sheet 92 regardless of the kind of image acquisition device connected to computer system 1. Accordingly, the interface for control displayed in "Tone" property page 95 corresponds to core tone features common to different image acquisition devices. Any user manipulation of the interface is immediately reflected by preview image 76.

"Tone" property page 95 is an example of a property page that advantageously provides plural interfaces for control provided by the property page. Briefly, a property page within a property sheet provides plural interfaces for control by having a control region and a button region, the button region having multiple buttons. An appearance of the control region is changed in response to user manipulation of the multiple buttons, with different appearances providing different interfaces for control.

In more detail, "Tone" property page 95 has button region 130 and control region 131. Button region 130 includes multiple buttons: automatic tone control button 133, brightness/contrast tone control button 134, gamma tone control button 135, histogram tone control button 136, and editable curve tone control button 137. Note that in the preferred embodiment, these buttons are radio-style buttons, meaning that only one button can be selected at a time.

Each button corresponds to a different interface for controlling tone. When one of the buttons is selected, the appearance of control region 131 is changed accordingly, providing the corresponding interface for controlling tone. This arrangement attractively provides plural interfaces for the control provided by "Tone" property page 95.

Figure 11A:
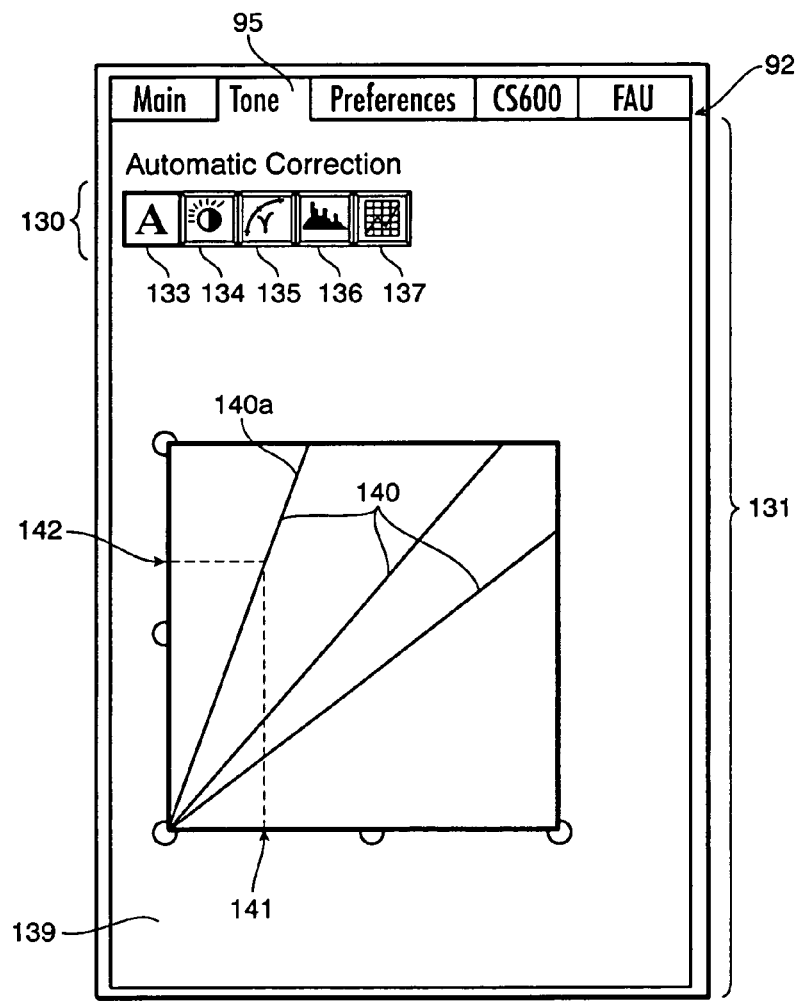
FIGS. 11a through 11e are views illustrating a "Tone" property page, which provides plural interfaces to tone core control.

FIG. 11a is a view illustrating an interface for automatic tone control. Automatic tone control button 133 has been selected, causing "Tone" property page 95 to display automatic tone control interface 139 in control region 131. Alternatively, this interface can be displayed as the default tone control interface when "Tone" property page 95 is first displayed.

Automatic tone control interface 139 is the simplest interface, suitable for complete novices. As the name suggests, tone control is entirely automatic, with no user manipulation possible. Automatic tone control interface 139 simply displays tone curves 140 representing automatic tone adjustments made by an automatic color algorithm.

Briefly, curves 140 show transfer functions for red, green, and blue tone adjustments. The bottom axis represents input tones, and the side axis represents output tones. For example, with respect to curve 140a, input tone 141 (representing a dark tone) results in output tone 142 (representing a light tone).

Figure 11B:
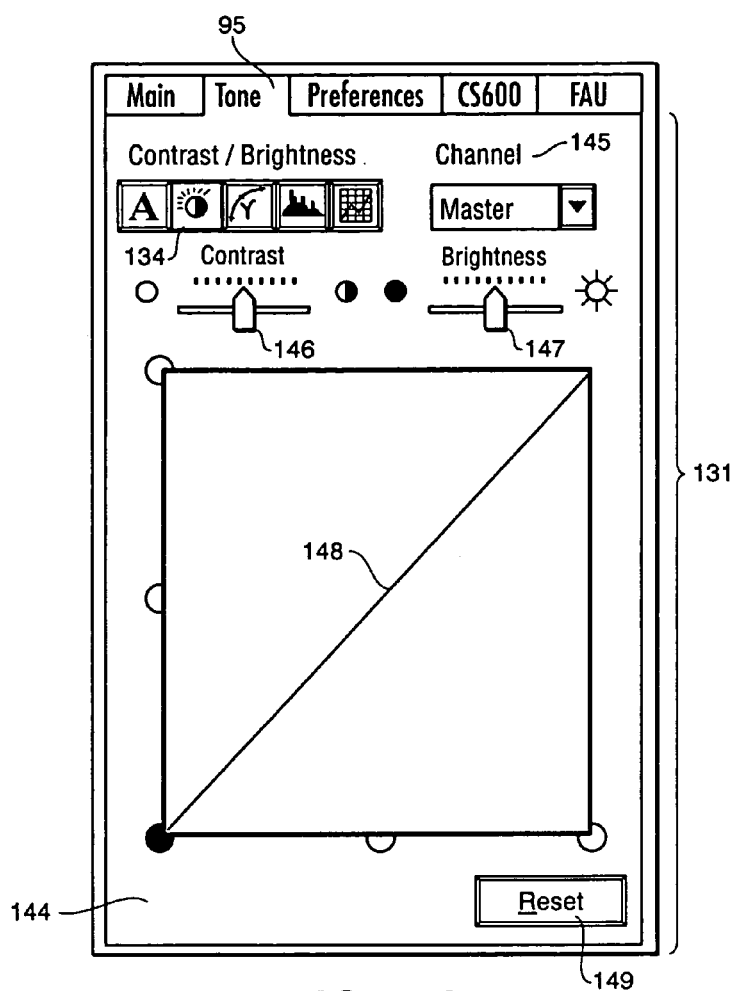

FIG. 11b is a view illustrating an interface for contrast/brightness tone control. Contrast/brightness tone control button 134 has been selected, causing "Tone" property page 95 to display contrast/brightness tone control interface 144 in control region 131. This interface is more complicated than automatic tone control interface 139, allowing some user manipulation. The user can choose to manipulate the master channel, the red channel, the green channel, or the blue channel via channel list box 145. The user then can manipulate contrast slide 146 and brightness slide 147 to adjust the tone. The manipulations are reflected in tone curve 148. Finally, reset button 148 can be used to reset brightness/contrast tone control interface 144 to default values.

Figure 11C:
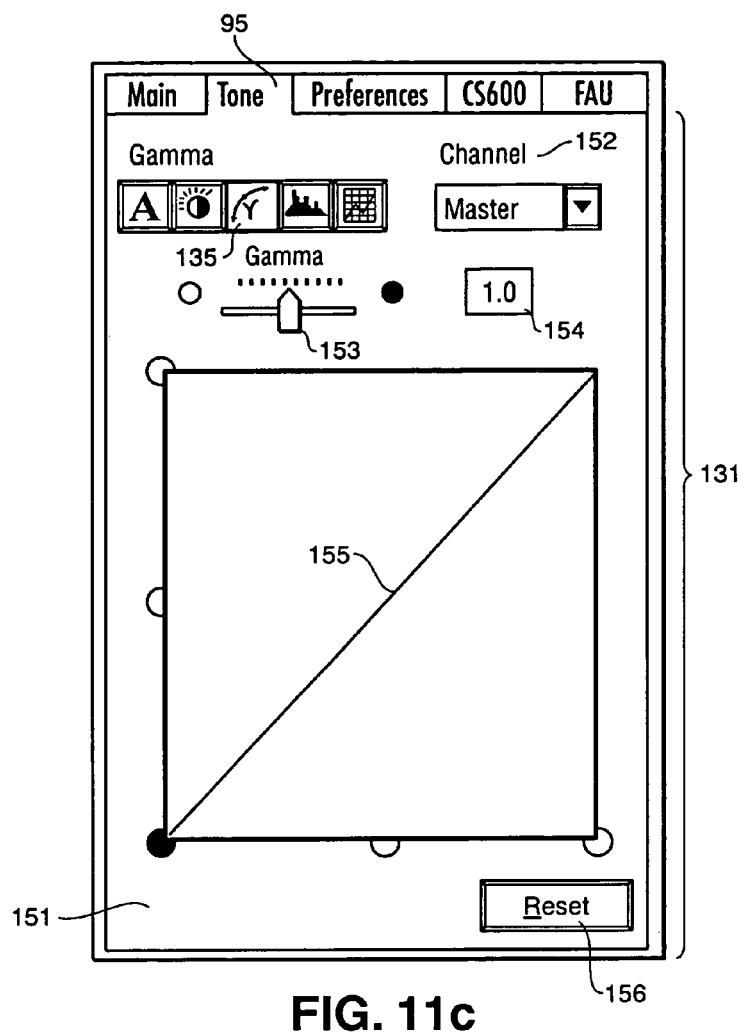

FIG. 11c is a view illustrating an interface for gamma tone control. Gamma tone control button 135 has been selected, causing "Tone" property page 95 to display gamma tone control interface 151 in control region 131. The user can choose to manipulate the master channel, the red channel, the green channel, or the blue channel via channel list box 152. The user then can adjust the gamma setting, a measure of tone adjustment well-known to those familiar with image processing, with gamma slide 153. The gamma value is displayed in text box 154. Alternatively, a gamma value can be directly entered into text box 154. Tone curve 155 reflects the resulting effect on the transfer function of a controlled tone channel. Finally, reset button 156 can be used to reset gamma tone control interface 151 to default values.

Figure 11D:
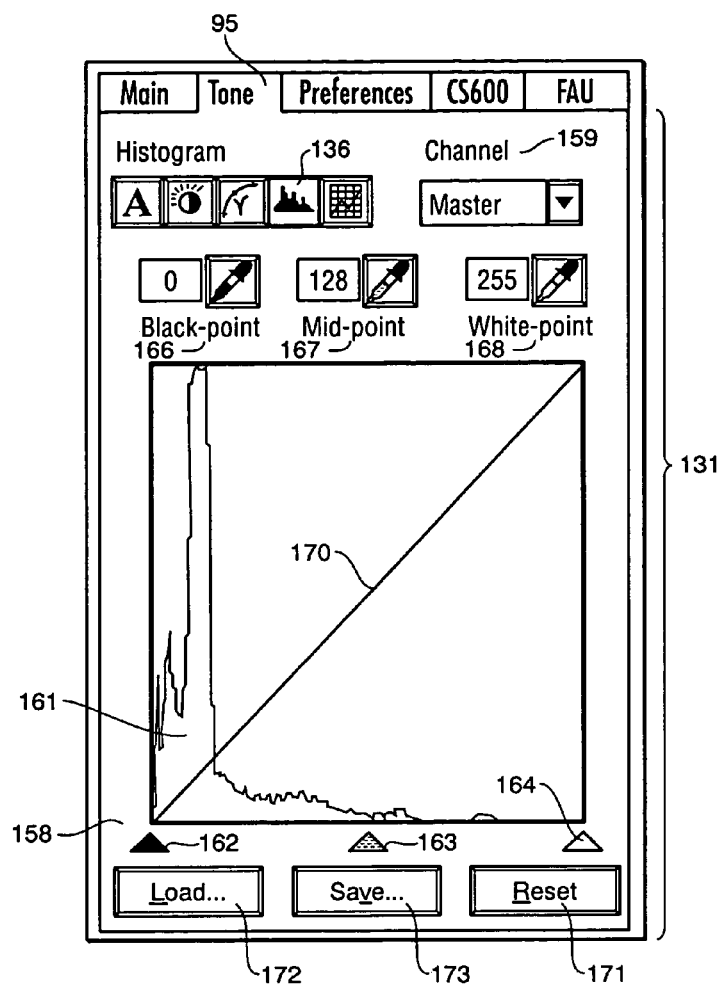

FIG. 11d is a view illustrating an interface for histogram tone control. Histogram tone control button 136 has been selected, causing "Tone" property page 95 to display histogram tone control interface 158 in control region 131. The user can choose to manipulate the master channel, the red channel, the green channel, or the blue channel via channel list box 159.

Histogram 161 shows a histogram of the tone values shown in preview image 76. This histogram reflects each input tone within preview image 76. Thus, every input tone is assigned a point along the horizontal axis of the histogram according to the value of the tone. The height of the histogram at each point along the horizontal axis corresponds to the number of pixels in preview image 76 having tones corresponding to that point. Black point 162, midpoint 163, and white-point 164 are also shown on the histogram. The tone values corresponding to these points can be controlled with black-point adjustment 166, midpoint adjustment 167, and white-point adjustment 168. The only constraint is that mid-point 163 must remain between black-point 162 and white-point 164.

Each adjustment is composed of a text box and an eye-dropper tool. To change an adjustment, the user either enters a value into the text box or selects an eye-dropper tool. If an eye-dropper tool is selected, the cursor is changed into the selected eye-dropper. The user then selects a pixel from preview image 76 in preview area 67, and the value of the selected pixel is used to set the tone point corresponding to the selected eye-dropper.

Every input tone in the previewed image to the left of black-point 162 is output as a 0% tone (e.g., completely black). Similarly, every input tone to the right of white-point 164 is output as a 100% tone (e.g., completely white or completely red). Input tones between black-point 162 and white-point 164 are output as partial tones, with the percent tone determined by the position of grey-point 163. Tone curve 170 reflects these adjustments. Note that white point 162 can be set to the left of black point 164 with the tone adjustments. In that case, the above rules are reversed (i.e., input tones to the right or black-point 162 are output as 0% tones; input tones to the left of white-point 164 are output as 100% tones), resulting in a "negative" type preview image in preview area 67. Finally, reset button 171 can be used to reset histogram tone control interface 158 to default values.

Note that the histogram control is the most complicated discussed so far. Accordingly, making histogram adjustments may take considerable time and expertise. Therefore, histogram tone control interface 158 also includes load button 172 and save button 173. These buttons cause standard dialog boxes to appear for loading and saving histogram adjustments.

Figure 11E:
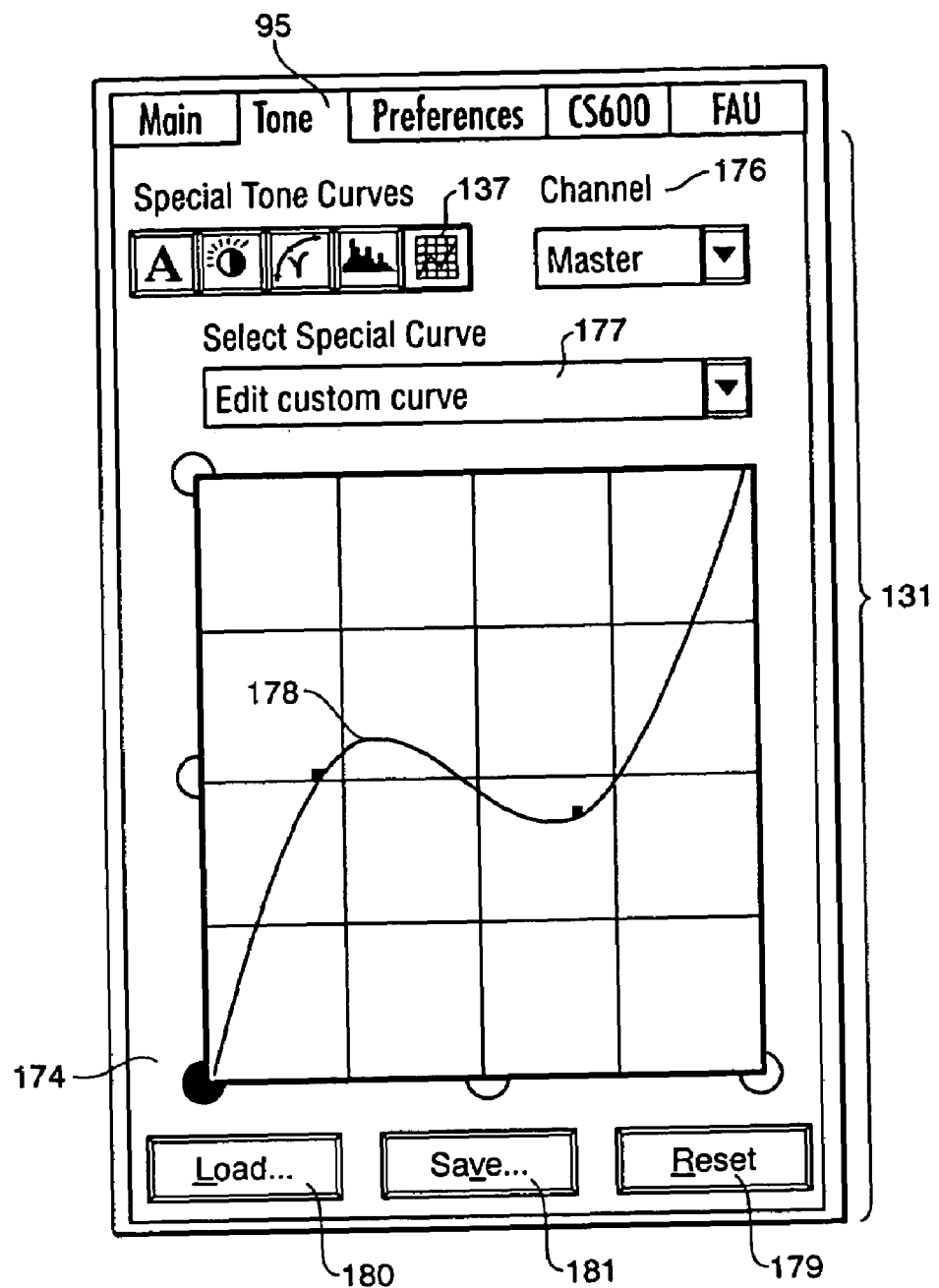

FIG. 11e is a view illustrating an interface for editable curve tone control. Editable curve tone control button 137 has been selected, causing "Tone" property page 95 to display editable curve tone control interface 174 in control region 131. This interface is the most complex in that it provides the greatest freedom in controlling tone features. Accordingly, the editable curve tone control is suitable for experts.

The user can choose to manipulate the master channel, the red channel, the green channel, or the blue channel via channel list box 176. The user then can select a special curve to apply to the tone via pull-down menu 177. Alternatively, the user can directly manipulate editable tone curve 178. In the preferred embodiment, the user can add and move any number of points on editable tone curve 178, and the curve will adjust to fit the added or moved points. Finally, reset button 179 can be used to reset editable curve tone control interface 174 to default values.

As with histogram tone control interface 158, adjusting tone using editable curve tone control interface 174 may take considerable time and expertise. Therefore, editable curve tone control interface 174 also has load button 180 and save button 181. These buttons cause standard dialog boxes to appear for loading and saving curve adjustments.

Note that the buttons in button region 130 are ordered according to the interfaces that result from selecting each of the buttons. In the representative embodiment discussed above, the ordering is based on the familiarity of the interfaces to users of different levels of expertise. Thus, as shown in FIGS. 11a through 11e, the left-most button corresponds to an interface familiar to novices (automatic tone control), and the right-most button corresponds to an interface familiar primarily to experts (editable curve tone control). This ordering is advantageous because it allows a user to progress in order from interfaces familiar to novices to those familiar to experts as his or her expertise increases.

In another embodiment, the ordering is based on the complexity of the interface, meaning the number and type of slides, list boxes, curves, etc. Thus, the ordering is the same as that shown in FIGS. 11a through 11e, except that gamma tone control button 135, which corresponds to an interface having one slide control, precedes brightness/contrast tone control button 134, which corresponds to an interface having two slide controls. This ordering is advantageous because it allows a user to select the interface that provides the simplest controls suitable for his or her needs. Of course, the ordering may also be based on a combination of interface familiarity and interface complexity.

Figure 12:
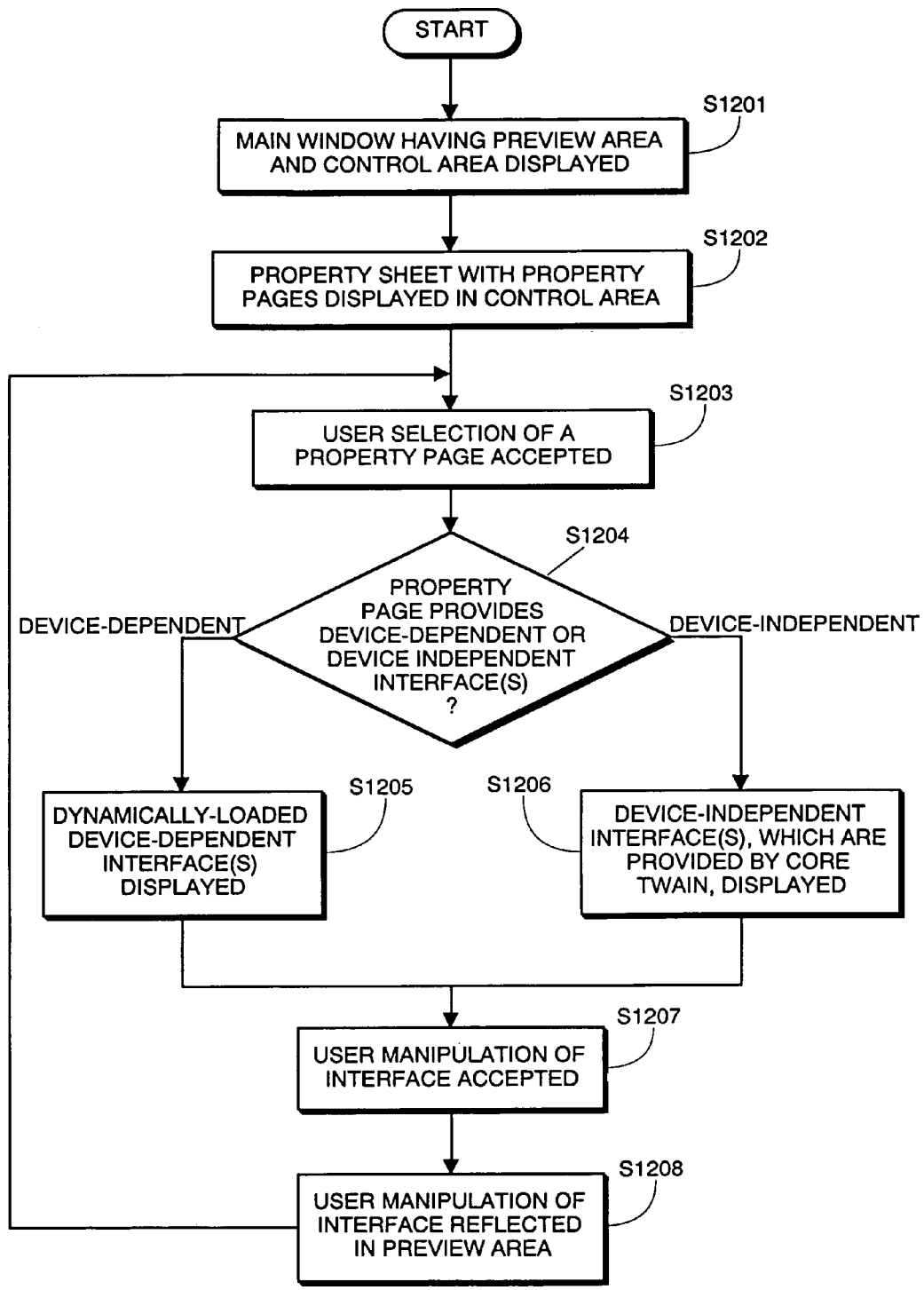
FIG. 12 is a flowchart for describing how device-dependent interfaces and device-independent core interfaces, which are provided by a user interface for an image acquisition device, are displayed in a property page and manipulated.

FIG. 12 is a flowchart for describing how device-dependent interfaces and device-independent core interfaces, which are provided by a user interface for an image acquisition device, are displayed in a property page and manipulated. First, in step S1201, main window 65 having preview area 67 and control area 69 is displayed. In step S1202, property sheet 92 with property pages 94 through 98 is displayed in control area 69. Each property page provides one or more interfaces to a control. In the preferred embodiment, the control is described by a tab on the property page. Also, in the preferred embodiment, steps S1201 and S1202 occur simultaneously. User selection of a property page is accepted in step S1203.

In step S1204, it is determined whether the selected property page provides at least one device-dependent interface or at least one device-independent interface. Device-dependent interfaces are for features unique to a particular kind of image acquisition device. Device independent interfaces are for features common to different image acquisition devices. If the property page provides a device-dependent interface, in step S1205 an appropriate dynamically-loaded device-dependent interface is displayed. If the property page provides a device-independent interface, in step S1206 an appropriate device-independent interface, which is provided by the core TWAIN, is displayed. In either case, flow proceeds to step S1207, where user manipulation of the displayed interface is accepted. In step S1208, the user manipulation of the displayed interface is reflected in the preview area. Finally, flow returns to step S1203 so as to allow the user to select another property page.

By means of the above, the invention provides a common control for common features of different image acquisition devices by means of interfaces provided by a core TWAIN data source. The invention also retains the flexibility needed to provide tailored controls that take advantage of the unique features of each different image acquisition device by means of the dynamically-loaded interfaces.

Figure 13:
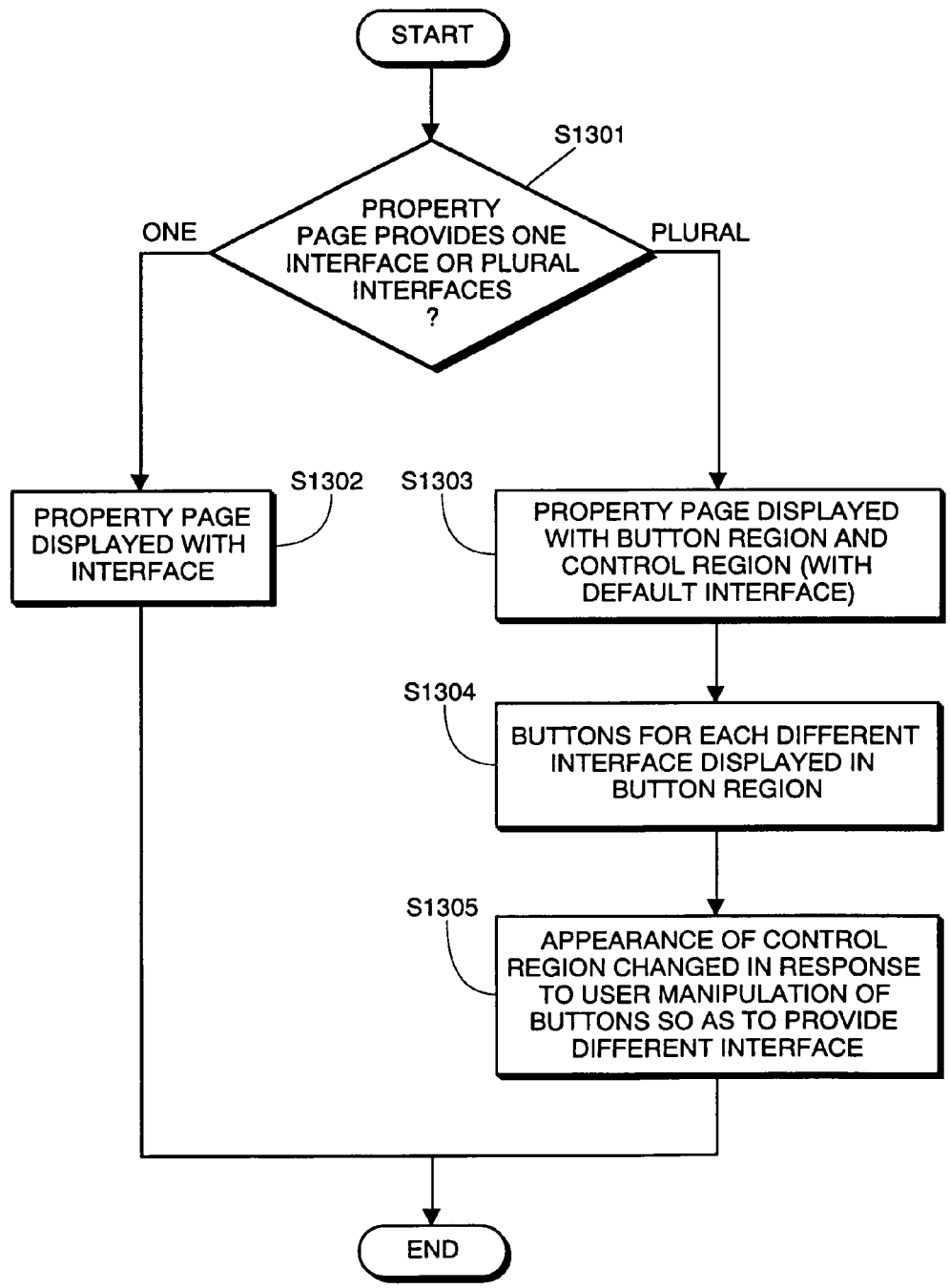
FIG. 13 is a flowchart for describing how interfaces are displayed in a property page, with changes in the appearance of a control region of the property page providing different interfaces.

FIG. 13 is a flowchart for describing how interfaces are displayed in a property page, with changes in the appearance of a control region of the property page providing different interfaces. This operation is performed in both step S1205 and step S1206 of FIG. 12, described above.

In step S1301, it is determined if the property page provides one interface or plural interfaces. For example, "Main" property page 94 provides one interface for main control. In contrast, "Tone" property page 95 provides many interfaces for tone control. If only one interface is provided, the corresponding property page, such as "Main" property page 94, is displayed in step S1302 with its one interface.

If many interfaces are provided, a property page with both a button region and a control region is displayed in step S1303. For example, "Tone" property page 95 is displayed with button region 130 and control region 131. Note that when "Tone" property page 95 is first displayed, a default interface such as automatic tone control interface 139 is displayed in control region 131.

In step S1304, multiple buttons are displayed in the button region, one for each available interface. Thus, with respect to "Tone" property page 95, five buttons 133 through 137 are displayed for the five available interfaces (i.e., automatic, contrast/brightness, gamma, histogram, and editable curve tone control interfaces). Next, in step S1305, the appearance of the control region is changed in response to user manipulation of the multiple buttons. Different appearances provide different interfaces for control provided by the property page. For example, if histogram tone control button 136 is selected in button region 130, the appearance of control region 131 is changed so as to display histogram tone control interface 139, which provides histogram tone control. Alternatively, if the user does not manipulate the multiple buttons, the default interface is retained in control region 131.

Figure 14:
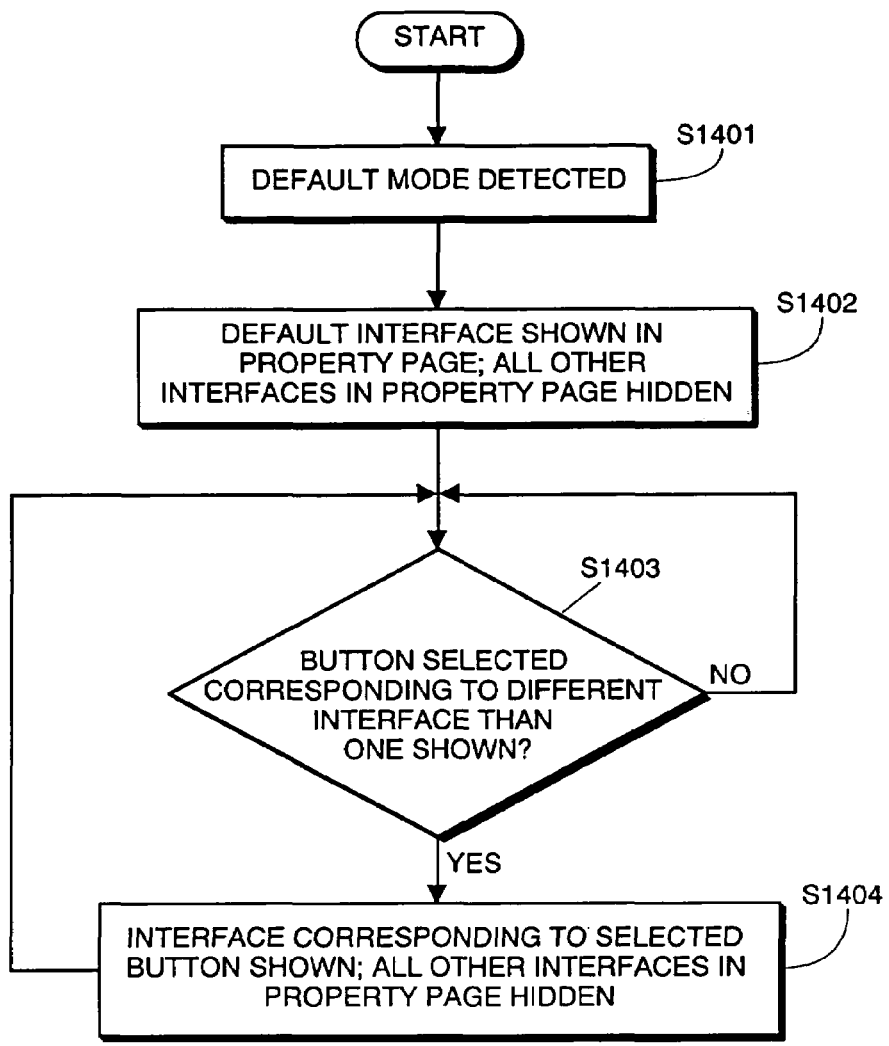
FIG. 14 is a flowchart for describing how an appearance of a property page is changed so as to provide plural different interfaces.

FIG. 14 is a flowchart for describing how an appearance of a property page is changed so as to provide plural different interfaces. This operation corresponds to steps S1303 through S1305 in FIG. 13. Briefly, the property page includes plural elements such as list boxes, text boxes, slides, curves, and the like. A first interface includes at least one of the plural elements, and a second interface includes at least one of the plural elements. The first interface is provided by showing the at least one of the plural elements included in the first interface and by hiding all other of the plural elements. In response to user manipulation of multiple buttons, the appearance of the property page is changed so as to provide the second interface. The second interface is provided by showing the at least one of the plural elements included in the second interface and by hiding all other of the plural elements.

In more detail, in step S1401, a default mode for the property page is detected. This default mode indicates the interface that is shown when the property page is first displayed. In the preferred embodiment, this "default interface" is indicated by information on hard disk 6, particularly, in the Windows registry.

In step S1402, the default interface is shown in the property page; all other interfaces in the property page are hidden. This step is performed because, in the preferred embodiment, the property page actually contains all of the elements (i.e., list boxes, text boxes, slides, etc.) for every interface. For example, "Tone" property page 95 includes tone curves 140, channel list box 145, contrast slide 146, brightness slide 147, tone curve 148, channel list box 152, gamma slide 153, tone curve 155, black-point adjustment 166, mid-point adjustment 167, white-point adjustment 168, etc. Thus, in order to show a particular interface, the elements corresponding to the particular interface are shown. In order to hide the other interfaces, all other elements are hidden. In this regard, identical elements in different interfaces, such as channel list box 145 in contrast/brightness tone control interface 144 and channel list box 152 in gamma tone control interface 151, are actually the same element shown in combination with different elements so as to form different interfaces.

In an alternative embodiment, each interface consists of a window having elements entirely separate for each other interface. Thus, channel list box 145 and channel list box 152 are different elements of different windows. Accordingly, in step S1402, the windows for each interface are layered upon each other, with the uppermost window corresponding to the shown interface. As a result, the shown interface masks out the interfaces below it, thereby hiding the other interfaces.

In step S1403, it is determined if a button is selected corresponding to an interface different than the interface currently shown in the property page. If such a button is selected, flow proceeds to step S1404. In step S1404, the interface corresponding to the selected button is shown; all other interfaces are hidden.

Appendix A includes sample code illustrating one implementation of this aspect of the invention, within a Microsoft® Windows environment. Generally speaking, according to this implementation, a property sheet is embedded within a property page. Thus, button region 130 and control region 131 actually form an embedded property sheet within "Tone" property page 95. Each individual interface in "Tone" property page 95, such as automatic tone control interface 139 or histogram tone control interface 158, is actually a property page of this embedded property sheet. Appendix A includes sample code implementing this structure in a Windows environment.

Appendix B includes similar code in a scripting language within an Apple® Macintosh environment.

Figure 15:
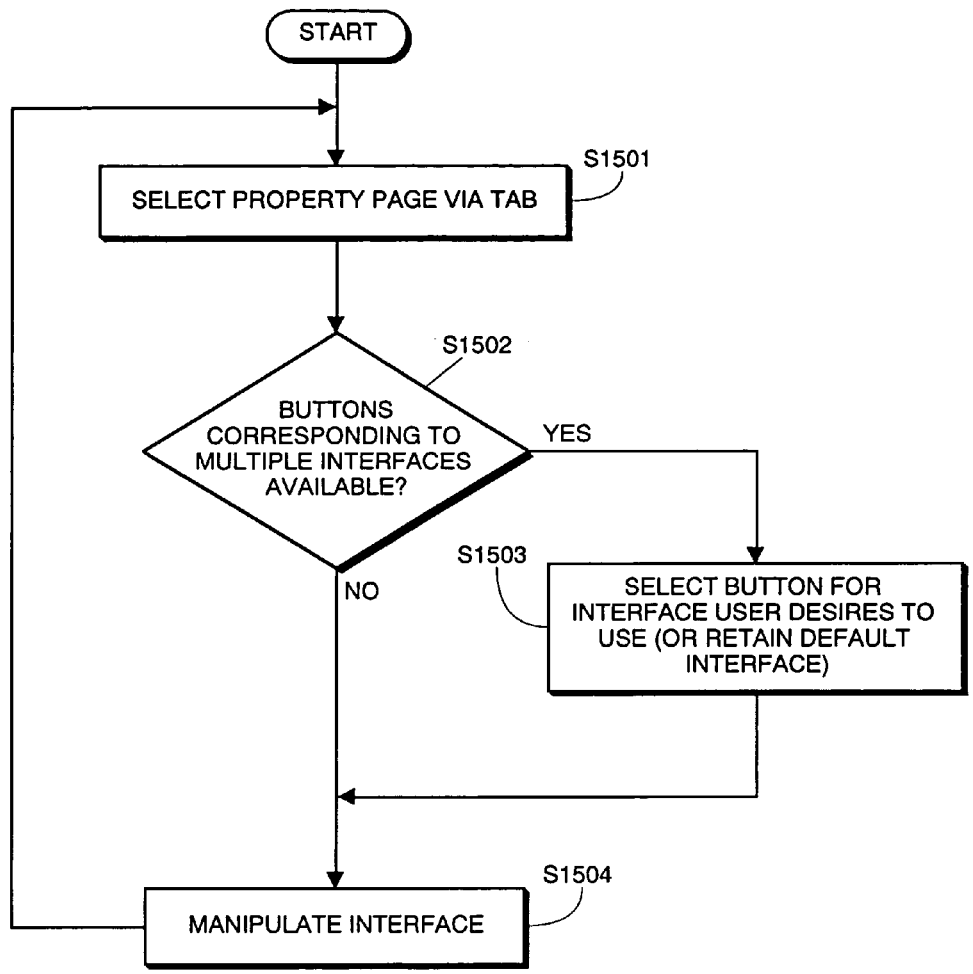
FIG. 15 is a flowchart for describing how the present user interface is used so as to control an image acquisition device.

FIG. 15 is a flowchart for describing how user interface 64 is used so as to control features of an image acquisition device. In other words, FIG. 14 is a flowchart for describing the same process as FIG. 12 through FIG. 14, only from the user's point of view.

Initially, the invention is activated and main window 65 is displayed with property sheet 92 in control area 69. As discussed above, property sheet 92 includes plural property pages 94 through 98. Each property pages includes a tab describing the set of features that property page controls. In step S1501, the user selects one of these property pages via a tab. In step S1502, the user determines if buttons corresponding to plural interfaces are available in the property page.

If buttons for plural interfaces are available, the user in step S1503 selects a button for the interface that the user desires to use. Alternatively, the user retains the default interface that first appears along with the multiple buttons. In step S1504, the user manipulates the interface displayed by the property page. Finally, flow returns to step S1501 so that the user can select another property page.

The present invention has been described with respect to particular illustrative embodiments. However, it is to be understood that the invention is not limited to the above described embodiments and that various changes and modifications may be made by those of ordinary skill in the art without departing from the spirit and scope of the invention. In particular, the above has been described using Windows terminology. However, the invention is equally applicable to other computing environments, such as Macintosh, Unix, and XWindows.

What is claimed is:

1. A user interface comprising:
a property page for adjusting a tone curve for an image acquisition device wherein said tone curve shows a transfer function for relating input tones of the image acquisition device to output tones, said property page having at least first and second selection elements displayed within the property page, each of the at least first and second selection elements for selecting and displaying a different appearance of a tone control region of the property page,
wherein the tone control region and the property page are an integral part of a same displayed window, and wherein the tone control region changes appearance such that a first appearance of the tone control region is displayed in response to selection of the first selection element, and a second appearance of the tone control region is displayed in response to selection of the second selection element, and
wherein the first appearance of the tone control region includes user-manipulable controls whose manipulation is reflected in said tone curve, and
wherein the second appearance of the tone control region includes a directly manipulable editable tone curve.

2. A user interface according to claim 1, wherein said first and second selection elements are shown both when the first appearance is provided and when the second appearance is provided.

3. A user interface according to claim 1, wherein said control clement comprises at least one element selected from the group of list boxes, text boxes, check boxes, slides, buttons, and editable curves.

4. A user interface according to claim 1, wherein the user interface is executed in a windowing environment.

5. A user interface according to claim 1, wherein said at least first and second selection elements are arranged based on the familiarity of the corresponding appearance of the tone control region to users of different levels of expertise or based on the complexity of the corresponding appearance of the tone control region.

6. A method for providing a user interface comprising the steps of:
displaying a property page for adjusting a tone curve for an image acquisition device, wherein said tone curve shows a transfer function for relating input tones of the image acquisition device to output tones, and displaying as part of the property page at least first and second selection elements, each of which for selecting and displaying a different appearance of a tone control region of the property page,
changing the tone control region of the property page in response to selection of one of the first and second selection elements such that a first appearance of the tone control region is displayed in response to selection of the first selection element, and a second appearance of the tone control region is displayed in response to selection of the second selection element, wherein the control region and the property page are an integral part of a same displayed window, and wherein the first appearance of the tone control region includes user-manipulable controls whose manipulation is reflected in said tone curve, and wherein the second appearance of the tone control region includes a directly manipulable editable tone curve.

7. A method for providing a user interface according to claim 6, wherein said first and second selection elements are shown both when the first appearance is provided and when the second appearance is provided.

8. A method for providing a user interface according to claim 6, wherein said control element comprises at least one element selected from the group of list boxes, text boxes, check boxes, slides, buttons, and editable curves.

9. A method for providing a user interface according to claim 6, wherein the user interface is executed in a windowing environment.

10. A method according to claim 6, wherein said at least first and second selection elements are arranged based on the familiarity of the corresponding appearance of the tone control region to users of different levels of expertise or based on the complexity of the corresponding appearance of the tone control region.

11. An apparatus for providing a user interface, comprising:

a memory for storing executable process steps including executable process steps for a user interface;

input means for inputting data;

output means for outputting data; and a processor for executing the process steps stored in said memory so as (1) to display a property page for adjusting a tone curve for an image acciuisition device, wherein said tone curve shows a transfer function for relating input tones of the image acquisition device to output tones, and to display as part of the property page at least first and second selection elements, each for selecting and displaying a different appearance of a tone control region of the property page, and (2) to change the tone control region of the property page in response to selection of one of the first and second selection elements such that a first appearance of the tone control region is displayed in response to selection of the first selection element, and a second appearance of the tone control region is displayed in response to selection of the second selection element, wherein the control region and the property page are an integral part of a same displayed window, and wherein the first appearance of the tone control region includes user-manipulable controls whose manipulation is reflected in said tone curve, and wherein the second appearance of the tone control region includes a directly manipulable editable tone curve.

12. An apparatus for providing a user interface according to claim 11, wherein said first and second selection elements are shown both when the first appearance is provided and when the second appearance is provided.

13. An apparatus for providing a user interface according to claim 11, wherein said control element comprises at least one element selected from the group of list boxes, text boxes, check boxes, slides, buttons, and editable curves.

14. An apparatus for providing a user interface according to claim 11, wherein the user interface is executed in a windowing environment.

15. An apparatus according to claim 11, wherein said at least first and second selection elements are arranged based on the familiarity of the corresponding appearance of the tone control region to users of different levels of expertise or based on the complexity of the corresponding appearance of the tone control region.

16. Computer-executable process steps stored on a computer-readable medium, the process steps for use on a computer system to provide a user interface, the process steps comprising:

code to display a property page for adjusting a tone curve for an image acquisition device, wherein said tone curve shows a transfer function for relating input tones of the image acquisition device to output tones, and to display as part of the property page at least first and second selection elements each for selecting and displaying a different appearance of a tone control region of the property page, and code to change the tone control region of the property page in response to selection of one of the first and second selection elements such that a first appearance of the tone control region is displayed in response to selection of the first selection element, and a second appearance of the tone control region is displayed in response to selection of the second selection element, wherein the control region and the property page are an integral part of a same displayed window, and wherein the first appearance of the tone control region includes user-manipulable controls whose manipulation is reflected in said tone curve, and wherein the second appearance of the tone control region includes a directly manipulable editable tone curve.

17. Computer-executable process steps according to claim 16, wherein said first and second selection elements are shown both when the first appearance is provided and when the second appearance is provided.

18. Computer-executable process steps according to claim 16, wherein said control element comprises at least one element selected from the group of list boxes, text boxes, check boxes, slides, buttons, and editable curves.

19. Computer-executable process steps according to claim 16, wherein the computer-executable process steps are executed in a windowing environment.

20. Computer-executable process steps according to claim 16, wherein said at least first and second selection elements are arranged based on the familiarity of the corresponding appearance of the tone control region to users of different levels of expertise or based on the complexity of the corresponding appearance of the tone control region.

21. A computer-readable medium which stores computer-executable process steps for use on a computer system to provide a user interface, the process steps comprising:

a displaying step to display a property page for adjusting a tone curve for an image acquisition device, wherein said tone curve shows a transfer function for relating input tones of the image acquisition device to output tones, and to display as part of the property page at least first and second selection elements each for selecting and displaying a different appearance of a tone control region of the property page;

a changing step to change the tone control region of the property page in response to selection of one of the first and second selection elements such that a first appearance of the tone control region is displayed in response to selection of the first selection element, and a second appearance of the tone control region is displayed in response to selection of the second selection element, wherein the control region and the property page are an integral part of a same displayed window, and wherein the first appearance of the tone control region includes user-manipulable controls whose manipulation is reflected in said tone curve, and wherein the second appearance of the tone control region includes a directly manipulable editable tone curve.

22. A computer-readable medium according to claim 21, wherein said first and second selection elements are shown both when the first appearance is provided and when the second appearance is provided.

23. A computer-readable medium according to claim 21, wherein said control element comprises at least one element selected from the group of list boxes, text boxes, check boxes, slides, buttons, and editable curves.

24. A computer-readable medium according to claim 21, wherein the process steps are computer-executable in a windowing environment.

25. A computer-readable medium according to claim 21, wherein said at least first and second selection elements are arranged based on the familiarity of the corresponding appearance of the tone control region to users of different levels of expertise or based on the complexity of the corresponding appearance of the tone control region.

* * * * *